(12) United States Patent
Tateishi et al.

(10) Patent No.: US 9,075,207 B2
(45) Date of Patent: Jul. 7, 2015

(54) OPTICAL MODULE AND METHOD OF MANUFACTURING OPTICAL MODULE

(75) Inventors: Hiroshi Tateishi, Yokkaichi (JP); Yuji Nakura, Yokkaichi (JP); Tomomi Sano, Yokohama (JP); Kiyoshi Kato, Yokohama (JP); Mitsuaki Nishie, Yokohama (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 85 days.

(21) Appl. No.: 14/001,340

(22) PCT Filed: Apr. 5, 2012

(86) PCT No.: PCT/JP2012/059326
§ 371 (c)(1),
(2), (4) Date: Aug. 23, 2013

(87) PCT Pub. No.: WO2012/141065
PCT Pub. Date: Oct. 18, 2012

(65) Prior Publication Data
US 2013/0336620 A1    Dec. 19, 2013

(30) Foreign Application Priority Data

Apr. 12, 2011 (JP) ................................ 2011-088009
Apr. 28, 2011 (JP) ................................ 2011-100627

(51) Int. Cl.
*G02B 6/32* (2006.01)
*G02B 6/42* (2006.01)

(52) U.S. Cl.
CPC ......... *G02B 6/4224* (2013.01); *Y10T 29/49124* (2015.01); *G02B 6/4221* (2013.01); *G02B 6/32* (2013.01); *G02B 6/4206* (2013.01)

(58) Field of Classification Search
CPC ........................... G02B 6/4221; G02B 6/4224
USPC ........................................ 385/49, 52, 88–94
See application file for complete search history.

(56) References Cited

U.S. PATENT DOCUMENTS 5,215,489 A * 6/1993 Nakamura ........................ 445/4
5,307,435 A * 4/1994 Chihara ........................ 385/92
(Continued)

FOREIGN PATENT DOCUMENTS

CN      1431787 A    7/2003
CN      2613771 Y    4/2004
(Continued)

OTHER PUBLICATIONS

Oct. 24, 2014 Office Action issued in Chinese Application No. 201280017771.0.
(Continued)

*Primary Examiner* — Daniel Petkovsek
(74) *Attorney, Agent, or Firm* — Oliff PLC

(57) ABSTRACT

A method of manufacturing an optical module includes the steps of applying the invisible light onto the resin member and the optical device, observing, with use of a camera, a part of the resin member located at the optical fiber coupling plane and an image formed at the optical fiber coupling plane by the optical device active layer while applying the invisible light onto the resin member and the optical device, aligning positions of the resin member and the circuit board with respect to each other while observing the part of the resin member located at the optical fiber coupling plane and the image formed at the optical fiber coupling plane, and fixing the resin member to the circuit board while maintaining the aligned positions of the resin member and the circuit board.

10 Claims, 34 Drawing Sheets

(56) References Cited

U.S. PATENT DOCUMENTS

| | | | |
|---|---|---|---|
| 5,537,503 A * | 7/1996 | Tojo et al. ............... | 385/93 |
| 5,621,831 A * | 4/1997 | Staver et al. ............. | 385/33 |
| 5,815,623 A * | 9/1998 | Gilliland et al. .......... | 385/93 |
| 5,916,458 A | 6/1999 | Komoriya et al. | |
| 6,325,551 B1 * | 12/2001 | Williamson, III et al. ..... | 385/88 |
| 6,409,398 B2 * | 6/2002 | Nakaya et al. ............ | 385/93 |
| 6,504,611 B2 * | 1/2003 | Kogan et al. ............. | 356/399 |
| 6,517,258 B1 | 2/2003 | Keska et al. | |
| 6,757,063 B2 * | 6/2004 | Kogan et al. ............. | 356/399 |
| 7,059,780 B2 * | 6/2006 | Yamabayashi et al. ...... | 385/88 |
| 2013/0219215 A1 | 8/2013 | Katz et al. | |

FOREIGN PATENT DOCUMENTS

| | | |
|---|---|---|
| CN | 1548938 A | 11/2004 |
| JP | A-4-53912 | 2/1992 |
| JP | A-7-294777 | 11/1995 |
| JP | A-2001-36100 | 2/2001 |
| JP | A-2006-227478 | 8/2006 |
| JP | A-2006-227635 | 8/2006 |
| JP | A-2007-121920 | 5/2007 |
| JP | A-2008-249913 | 10/2008 |
| JP | A-2009-271457 | 11/2009 |
| JP | 4920473 B2 | 4/2012 |

OTHER PUBLICATIONS

Office Action issued in Japanese Patent Application No. 2013-509863 dated Jun. 12, 2014 (with translation).
International Search Report issued in International Patent Application No. PCT/JP2012/059326 mailed Jun. 12, 2012.
Written Opinion of the International Searching Authority issued in International Patent Application No. PCT/JP2012/059326 mailed Jun. 12, 2012 (with translation).

* cited by examiner

FIG.4
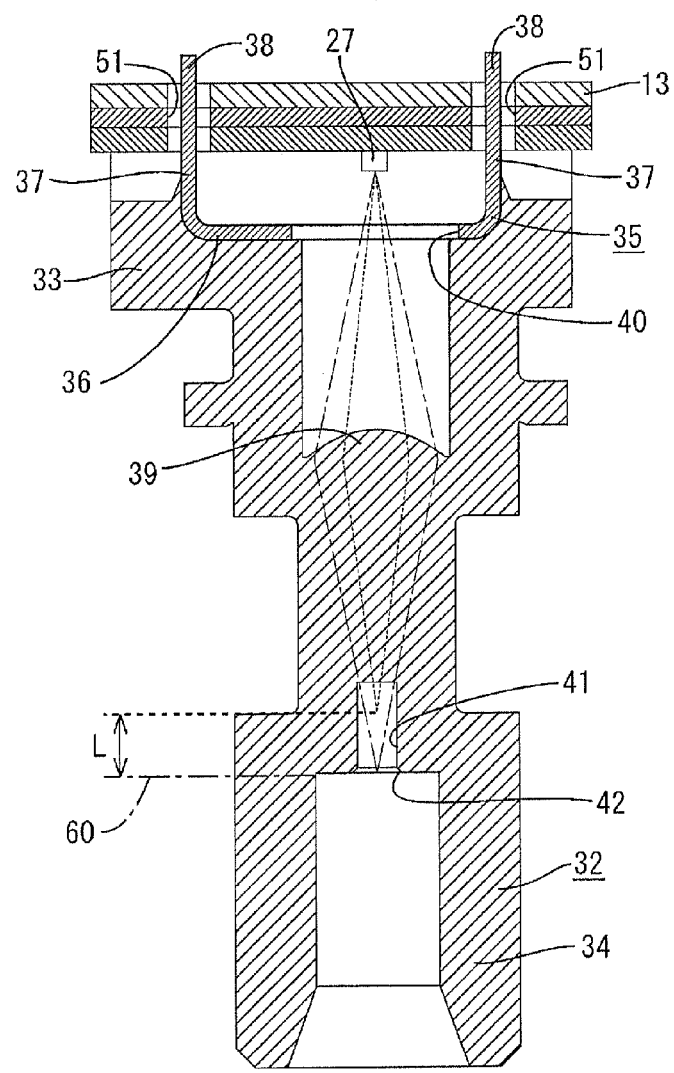
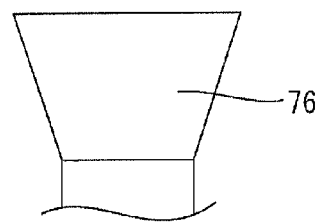

FIG.7
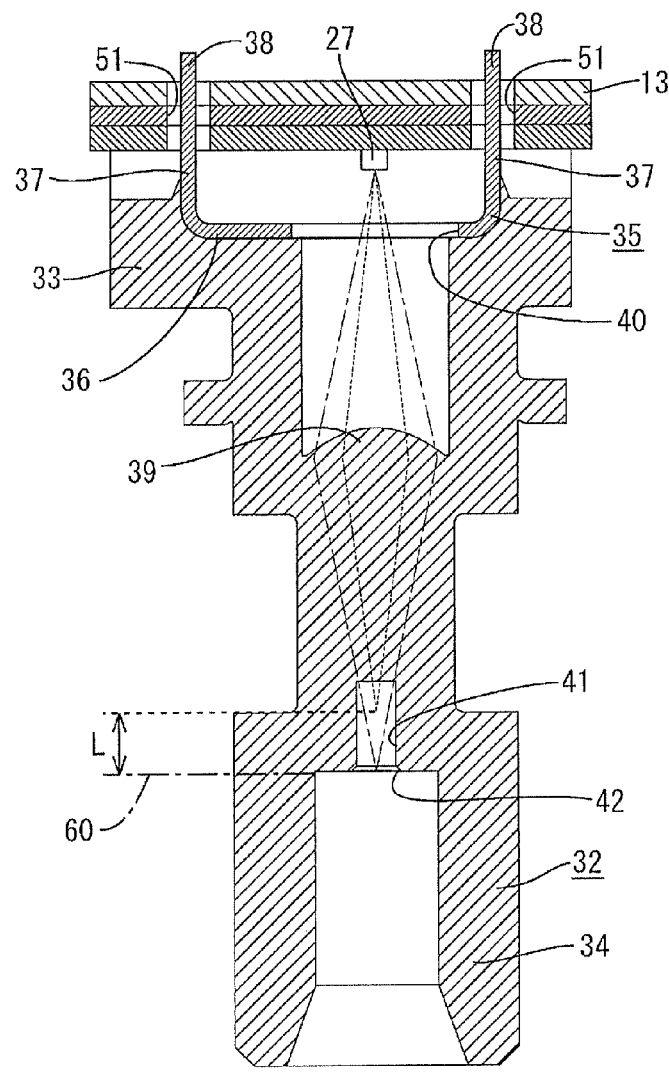
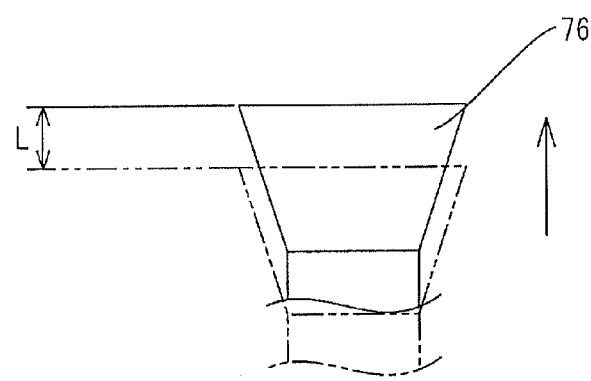

FIG.10
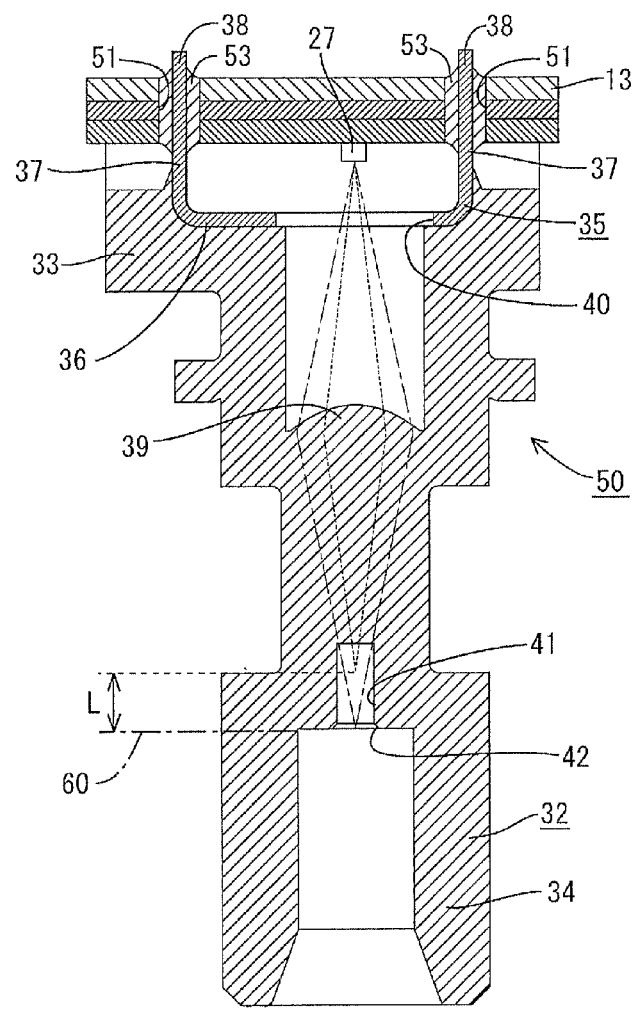
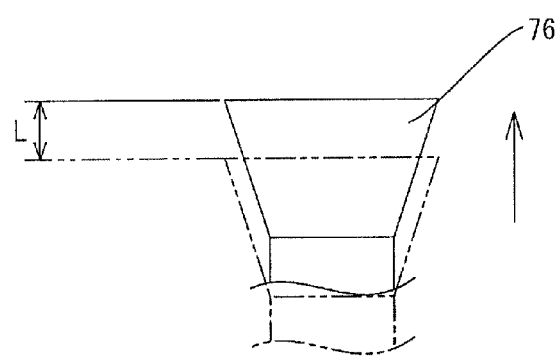

FIG.12
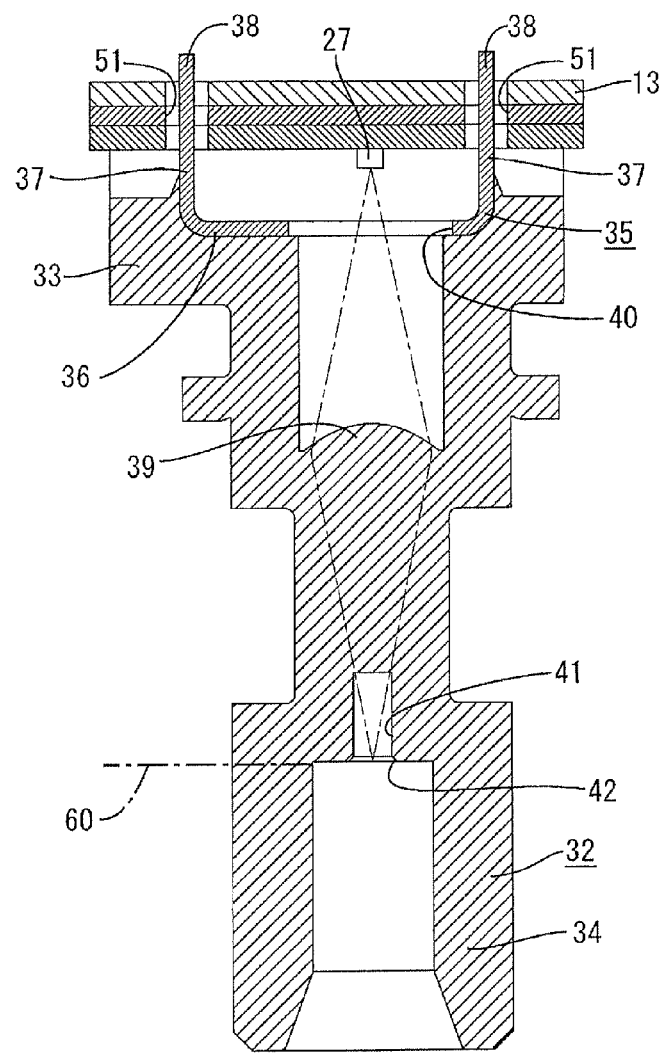
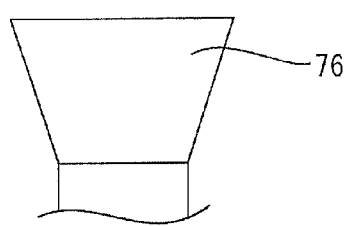

FIG.16
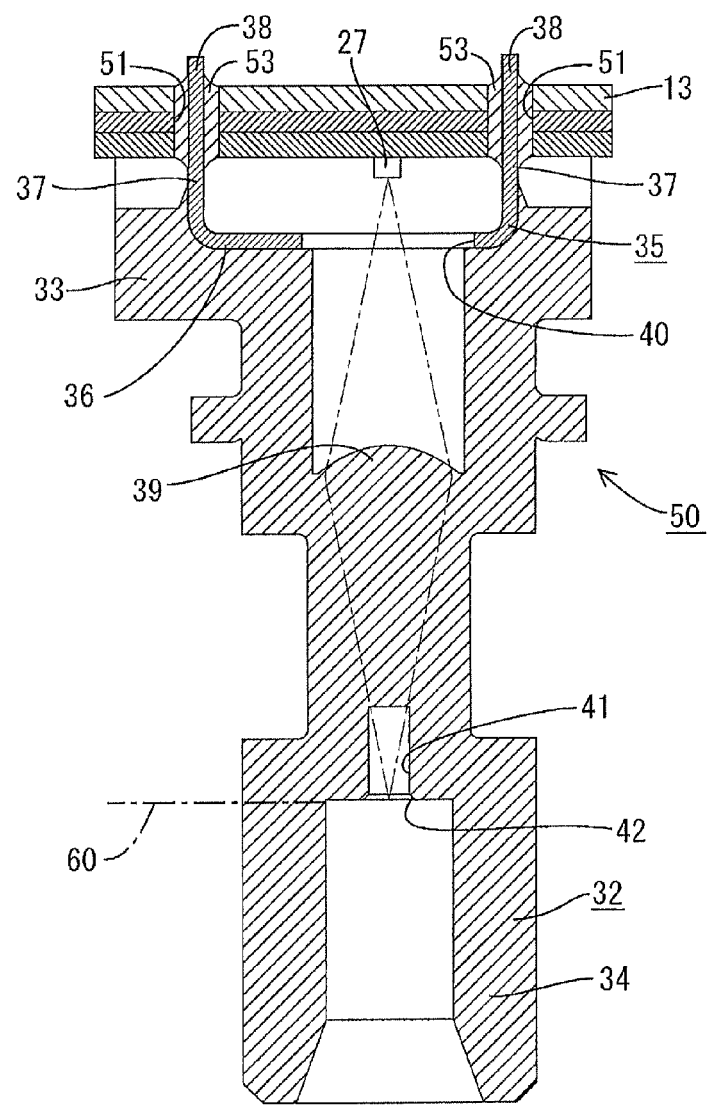
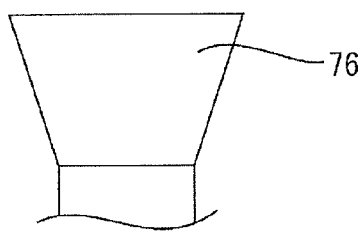

FIG. 20
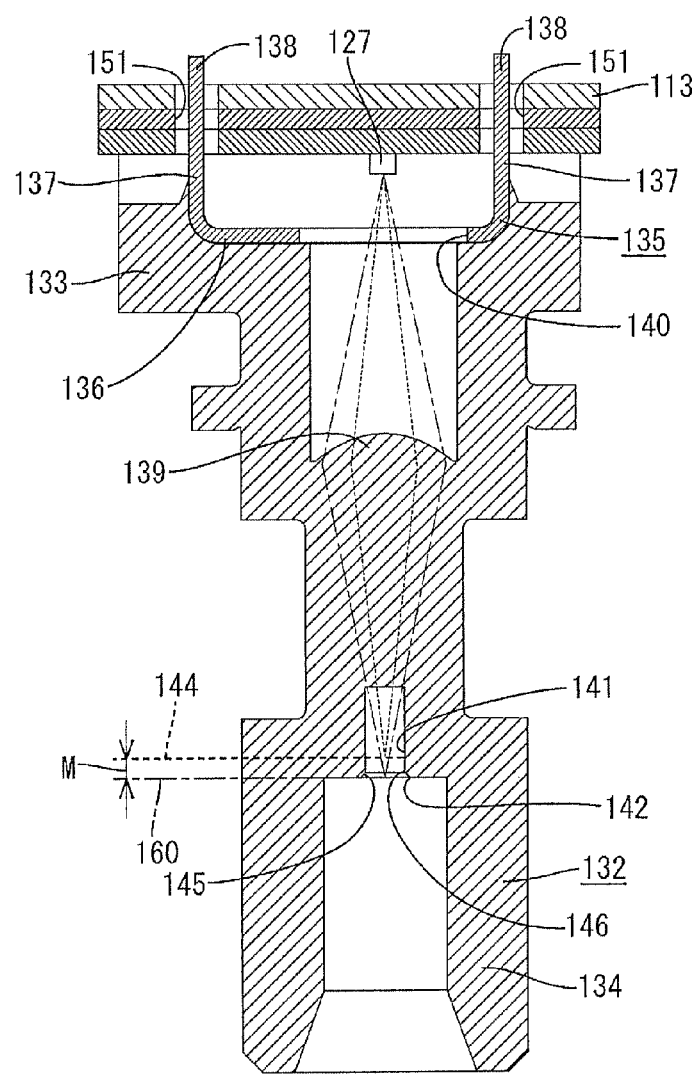
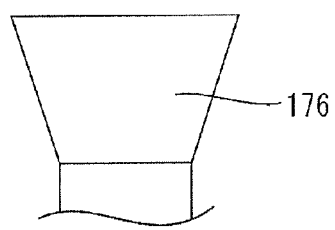

FIG.23
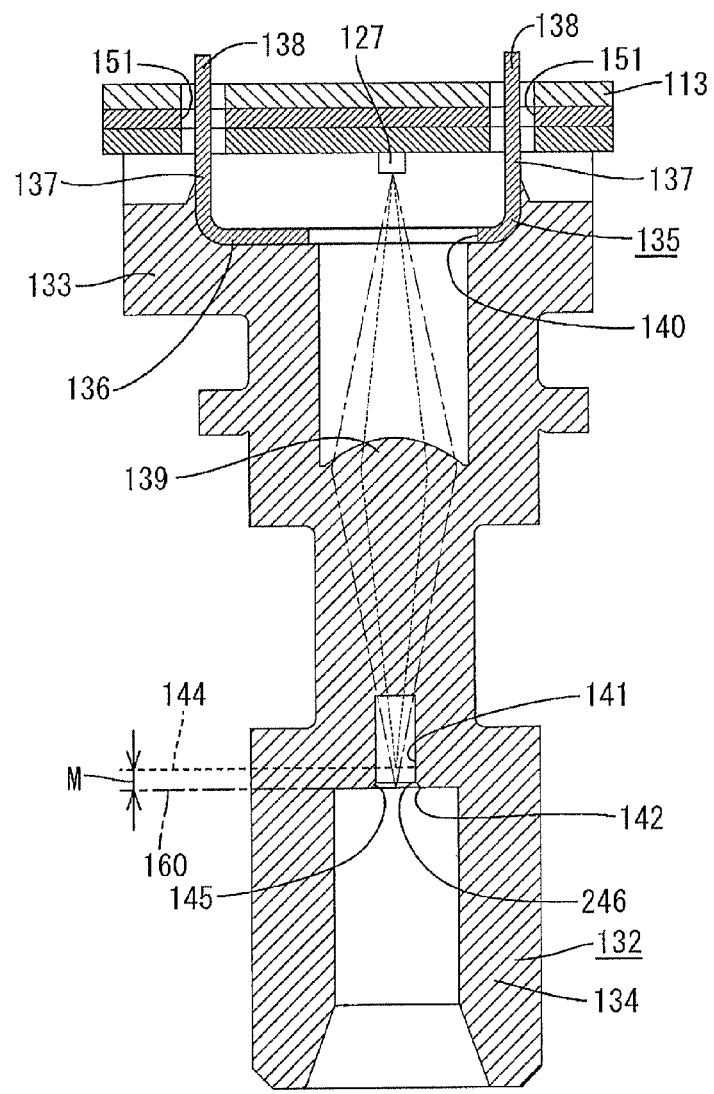
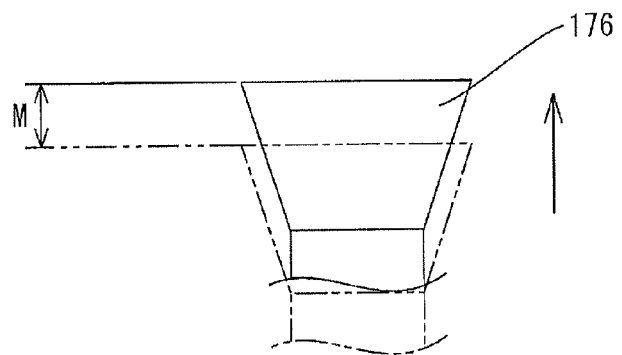

FIG. 26
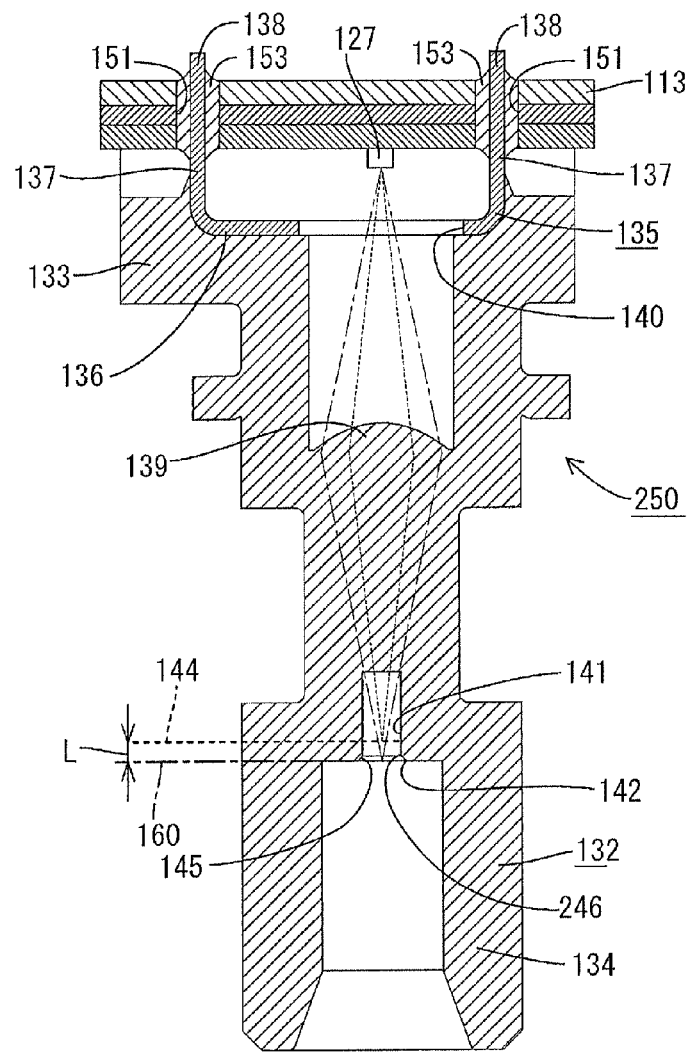
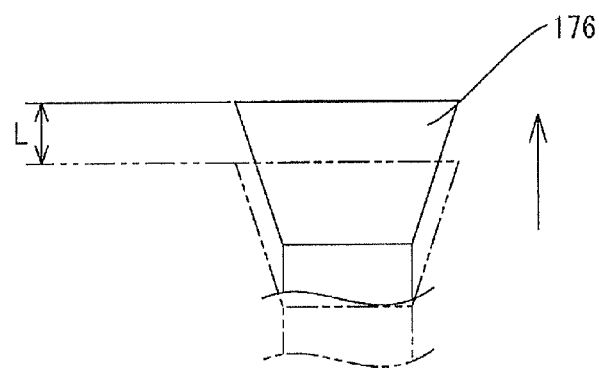

FIG.28
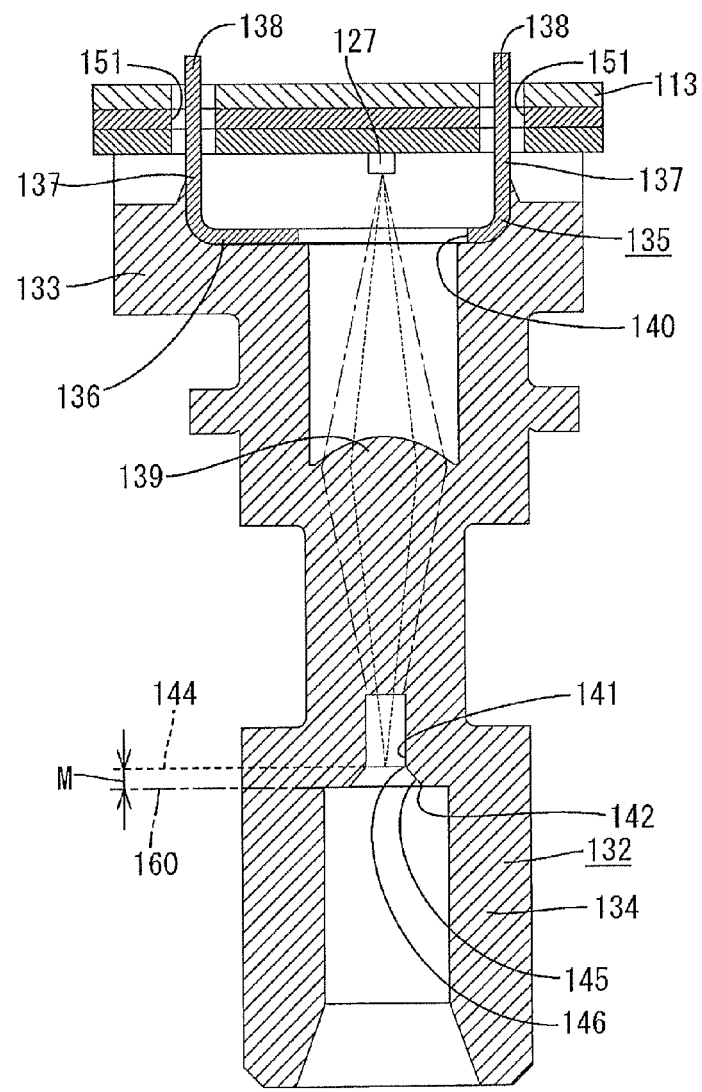
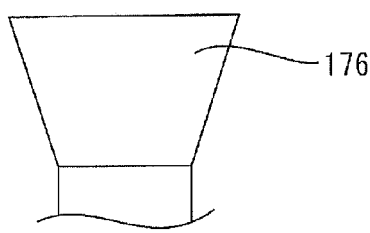

FIG.32
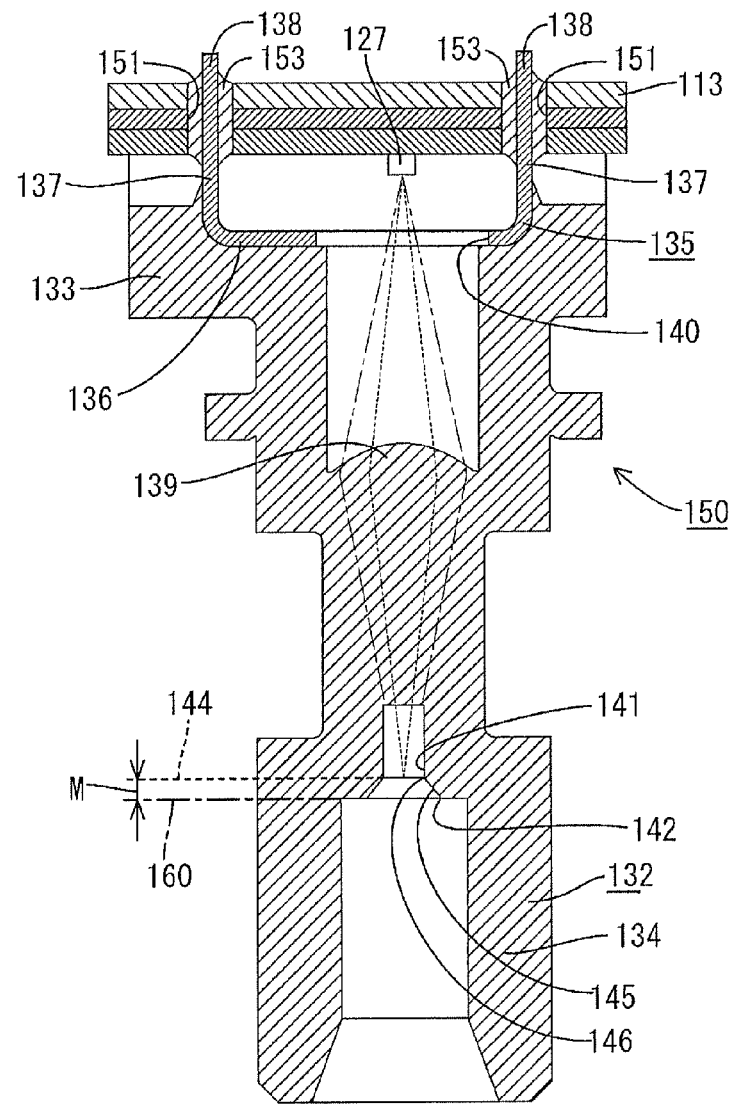
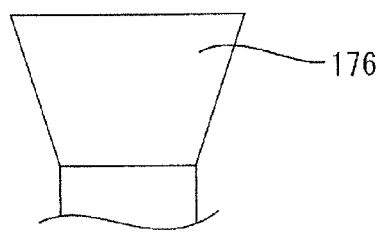

OPTICAL MODULE AND METHOD OF MANUFACTURING OPTICAL MODULE

TECHNICAL FIELD

This invention relates to an optical module and a method of manufacturing an optical module.

BACKGROUND ART

For use in the optical communication, an optical module including a member having a sleeve into which a ferrule fitted to a terminal of an optical fiber is inserted and an optical device has been conventionally known. In such an optical module, the position of the member having the sleeve and the position of the optical device are aligned. Such position alignment enhances the precision in the relative positions of the optical fiber inserted in the sleeve and the optical device. As a method for such position alignment, the method disclosed in Patent Document 1 has been known.

In the known technique, the optical device is disposed on a module package, and the module package is provided with a lens. The lens focuses the light from the terminal of the optical fiber on the optical device and the lens focuses the light from the optical device on the terminal of the optical fiber.

In the known technique, by observing the light transmitted through the lens, with use of an observation device (such as a microscope in the known technique), the position of the member having the sleeve and the position of the optical device are aligned.

Patent Document 1: Japanese Unexamined Patent Application Publication No. 2009-271457

The refractive index of the light depends on the wavelength thereof. Thus, after transmitted through the lens, light having a different wavelength is focused on a different plane. Therefore, when the wavelength of the light used in the position alignment is different from the wavelength of the light used in the optical communication, it is required to compensate position displacement caused by the use of the light respectively having different wavelengths.

In order to compensate the position displacement, the position of the observation device may be moved corresponding to the respective position where the light having different wavelength is focused. However, such method may deteriorate the position precision of the observation device upon moving the observation device.

Therefore, there is a need in the art to enhance position precision of an optical fiber and an optical device.

SUMMARY

An aspect of the invention provides a method of manufacturing an optical module including a circuit board on which an optical device is mounted, and a resin member disposed on the circuit board and formed of a light-transmissive synthetic resin. In the optical module, the resin member includes a sleeve into which a ferrule fitted around a terminal of an optical fiber is to be inserted, and a lens formed integrally with and on an axis of the sleeve. Further in the optical module, the optical device includes an optical device active layer adapted to emit or receive invisible light having a single wavelength used in optical communication, and the lens is configured such that the invisible light transmitted through the lens forms an image of the optical device active layer at an optical fiber coupling plane. The optical fiber coupling plane is a plane at which an end surface of the optical fiber is located when the ferrule is inserted into a normal position inside the sleeve. The method includes the steps of position aligning through which relative positions of the resin member and the circuit board are aligned by observing the resin member located at the optical fiber coupling plane and the optical device active layer whose image is formed at the optical fiber coupling plane, with use of a camera, while applying the invisible light onto the resin member and the optical device, and fixing through which the resin member is fixed to the circuit board while maintaining the aligned relative positions of the resin member and the circuit board.

According to the aspect of the invention, by adjusting the camera such that its focal point is located on the optical fiber coupling plane, an operator can observe, with use of the camera, the resin member located at the optical fiber coupling plane and the optical device active layer whose image is formed at the optical fiber coupling plane, at the same time. Therefore, since there is no need to move the camera to change the position of the focal point thereof in the position aligning step, the camera is prevented from being inclined with respect to the axis of the lens during the position aligning step. As the result, the displacement of the optical device active layer and the resin member from each other is prevented, and thus the position precision in aligning the optical device active layer and the resin member is enhanced.

ADVANTAGEOUS EFFECT OF THE INVENTION

According to the aspects of the invention, the position precision of the optical fiber and the optical device is enhanced.

BRIEF DESCRIPTION OF DRAWINGS

FIG. 4 is a cross-sectional view illustrating a position aligning step according to a known technique;

FIG. 7 is a cross-sectional view illustrating a step of moving the camera upward in the position aligning step according to the known technique;

FIG. 10 is a cross-sectional view illustrating fixing step of the resin member and a circuit board according to the known technique;

FIG. 12 is a cross-sectional view illustrating a position aligning step in a method of manufacturing an optical module according to the embodiment of the invention;

FIG. 16 is a cross-sectional view illustrating fixing step of the resin member and a circuit board according to the embodiment of the invention;

FIG. 20 is a cross-sectional view illustrating a position aligning step according to a known technique;

FIG. 23 is a cross-sectional view illustrating a step of moving the camera upward in the position aligning step according to the known technique;

FIG. 26 is a cross-sectional view illustrating fixing step of the sleeve member and a circuit board according to the known technique;

FIG. 28 is a cross-sectional view illustrating a position aligning step in a method of manufacturing an optical module according to the second embodiment of the invention;

FIG. 32 is a cross-sectional view illustrating fixing step of the sleeve member and a circuit board according to the embodiment of the invention;

MODES FOR CARRYING OUT THE INVENTION

<First Embodiment>
1. Optical Module 50

Figure 1:
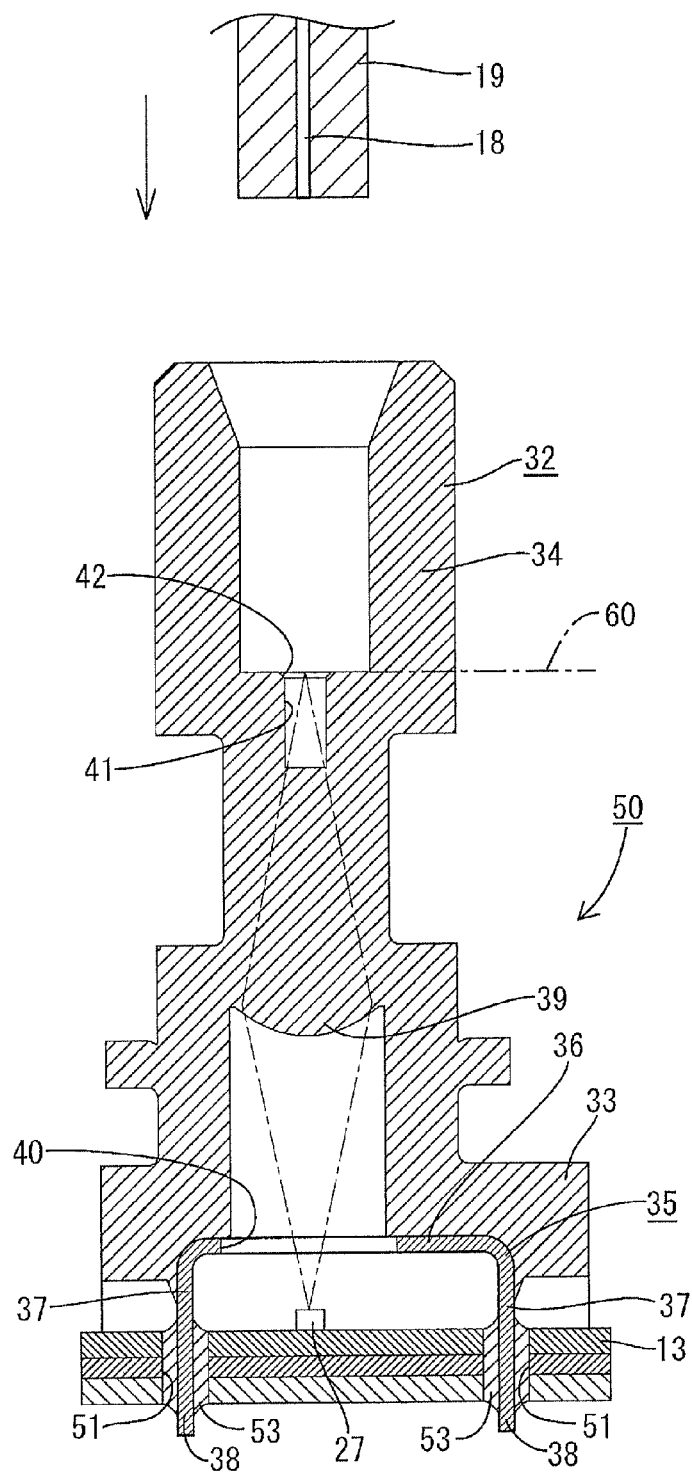
FIG. 1 is a cross-sectional view illustrating an optical module according to a first embodiment of the invention.

Initially, an optical module 50 manufactured by a manufacturing method according to the aspect of the invention will be described with reference to FIGS. 1 and 2. As illustrated in FIG. 1, the optical module 50 according to an embodiment of the invention includes a circuit board 13 on which an optical device 27 is mounted and resin member 32 having a sleeve 34 which is mounted onto the plate surface of the circuit board 13 and into which a ferrule 19 attached on a terminal of an optical fiber 18 is to be fitted.

(Circuit Board 13)

The circuit board 13 is provided with conduction paths (not illustrated) by printed wiring. On the top surface of the circuit board 13, the optical device 27 is connected to the conduction paths by a known technique such as reflow soldering. The optical device 27 is at least one of a light emitting element and a light receiving element. The top surface of the optical device 27 is provided with an optical device active layer 61. The optical device active layer 61 converts an electric signal into an optical output or converts an optical output into an electric signal. In this embodiment, the optical device active layer 61 is substantially circular whose diameter is about 10 μm.

The circuit board 13 is provided with a plurality of through holes 51 extending through the circuit board 13 in an up-and-down direction. The inner circumferences of the through holes 51 are provided with conduction paths.

(Shield 35)

To the plate surface of the circuit board 13 on which the optical device 27 is mounted, a shield 35 is attached to cover the optical device 27. The shield 35 is provided by forming a metal plate member into a predetermined shape by press working. The shield 35 includes a top plate 36; and side plates 37 extending from the top plate 36 toward the circuit board 13. Lower edges of the side plates 37 are provided with board connectors 38 extending downward. The board connectors 38 are inserted into the through holes 51 of the circuit board 13, and soldered with the conduction paths of the through holes 51 by a known method such as flow soldering. The through holes 51 are filled with solder 53 solidified after melted.

The inner diameters of the through holes 51 are set to be greater than the outer shapes of the board connectors 38. With this arrangement, the board connectors 38 before soldered with the through holes 51 are movable within the through holes 51 in a direction parallel to the plate surface of the circuit board 13.

(Resin Member 32)

To the plate surface of the circuit board 13 on which the optical device 27 is mounted, the resin member 32 is attached. The resin member 32 is made of a light-transmissive synthetic resin (such as PEI, PC and PMMA). The resin member 32 includes: a base 33 connected to the circuit board 13; and the sleeve 34 extending from the base 33 upward to accept the insertion of the ferrule 19 attached on the terminal of the optical fiber 18. The axis 43 of the sleeve 34 is substantially perpendicular to the plate surface of the circuit board 13. The "substantially perpendicular" means not only that the axis 43 of the sleeve 34 is perpendicular to the plate surface of the circuit board 13, but also that when the axis 43 of the sleeve 34 is not perpendicular to the plate surface of the circuit board 13, the axis 43 of the sleeve 34 is substantially perpendicular to the plate surface of the circuit board 13.

Figure 2:
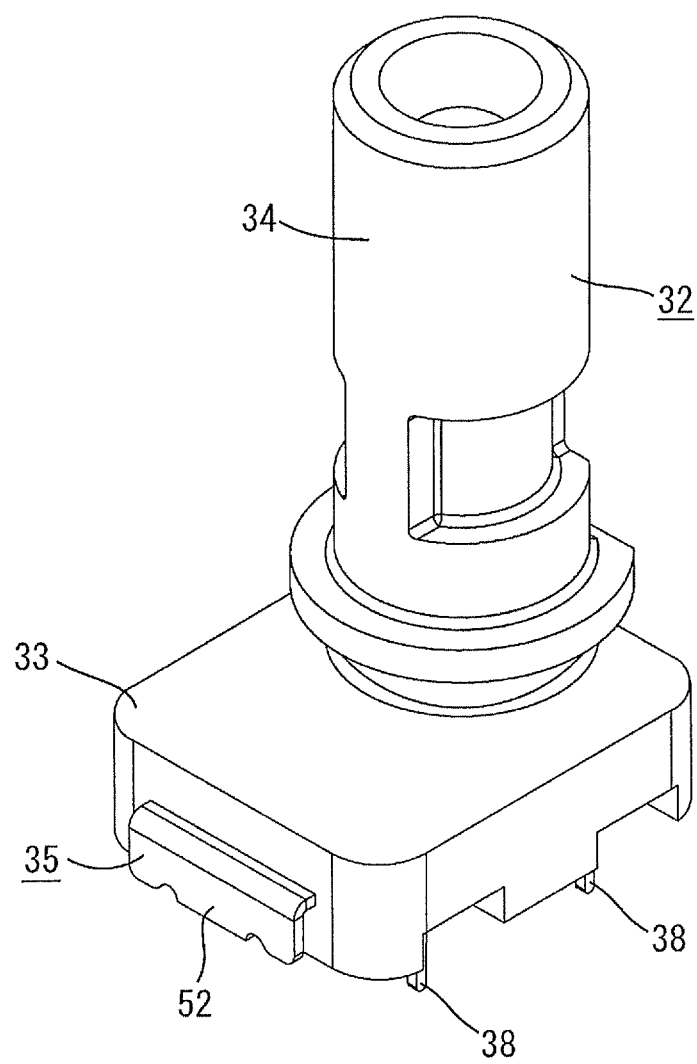
FIG. 2 is a perspective view illustrating a resin member.

As illustrated in FIG. 2, the base 33 is substantially rectangular when seen from the upper side. The sleeve 34 is substantially tubular. The bottom of the sleeve 34 serves as an optical fiber coupling plane 60 at which the end surface of the optical fiber 18 is located when the ferrule 19 is inserted into a normal position inside the sleeve 34.

As illustrated in FIG. 1, the bottom wall of the sleeve 34 has a bottomed hole. The bottomed hole serves as a relief hole 41 for avoiding the interference with the optical fiber 18 inserted into the sleeve 34. The relief hole 41 is substantially circular in the cross section.

The resin member 32 is integrally provided with a lens 39 on the optical path between the sleeve 34 and the optical device 27 and below the sleeve 34. The lens 39 bulges in the downward direction toward the circuit board 13. The lens 39 condenses and focuses the optical output from the optical fiber 18 on the optical device 27, and the lens 39 condenses and focuses the optical output from the optical device 27 on the lower end surface of the optical fiber 18.

In this embodiment, the light used in the optical communication is invisible light having a wavelength of 850 nm. The invisible light transmitted through the lens 39 forms an image of the optical device active layer 61 at the above-described optical fiber coupling plane 60.

The base 33 of the resin member 32 is integrated with the shield 35 by insert molding with use of a synthetic resin. A leg 52, which is an extension from the top plate 36 of the shield 35, protrudes outward from the base 33 of the resin member 32. The leg 52 is formed by bending the insert-molded shield 35 at a right angle in the downward direction (i.e., the direction toward the circuit board 13). The lower end edge of the leg 52 is substantially flush with the lower end edge of the resin member 32.

The top plate 36 of the shield 35 is provided with a window 40 on the optical path between the optical device 27 and the lens 39. The window 40 extends through the top plate 36. The window 40 provides the optical path between the optical device 27 and the lens 39.

2. Alignment System 70

Figure 3:
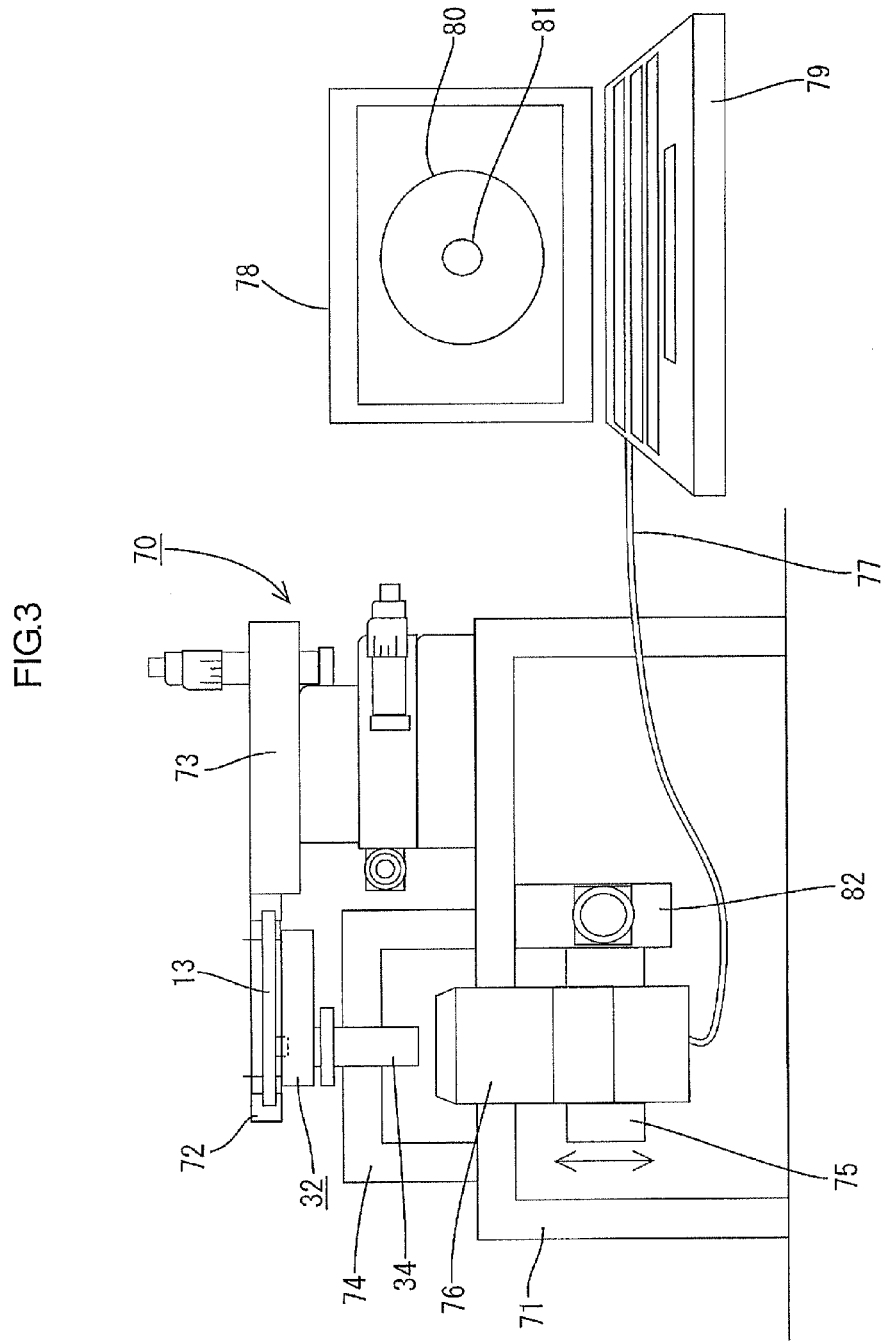
FIG. 3 depicts an alignment system.

Next, an alignment system 70 used in the manufacturing method according to the aspect of the invention will be described with reference to FIG. 3. A mount 71 is provided with a circuit board moving mechanism 73, which moves the circuit board 13 held by a circuit board holding mechanism 72 in a direction parallel to the plate surface of the circuit board 13. The circuit board 13 is held by the circuit board holding mechanism 72 such that the plate surface of the circuit board 13 is in a horizontal position and the optical device 27 faces downward.

The mount 71 is further provided with a resin member holding mechanism 74, which holds the resin member 32. The resin member 32 is held by the resin member holding mechanism 74 with the sleeve 34 downward and the base upward. The resin member 32 is held by the resin member holding mechanism 74 such that the axis 43 of the sleeve 34 is vertical.

The mount 71 is further provided with a camera moving mechanism 82 configured to move a camera 76 held by a camera holding mechanism 75 in the vertical direction. The camera moving mechanism 82 is also configured to move the camera 76 in the horizontal direction. In this embodiment, a CCD camera is used as the camera 76. The camera 76, however, may be any other camera suitably selected depending on needs.

The camera 76 is connected to a monitor 78 via a cable 77. The monitor 78 displays images captured by the camera 76. In this embodiment, the monitor 78 is connected to a computer 79, and the camera 76 is connected to the computer 79 via the cable 77 described above. The monitor 78, however, may be any other monitor 78 suitably selected depending on needs, as long as the monitor 78 displays the images captured by the camera 76.

In this embodiment, the screen of the monitor 78 displays: a first aiming field 80 for use in aligning the relative positions of the camera 76 and the resin member 32; and a second aiming field 81 for use in aligning the relative positions of the camera 76 and the optical device active layer 61. In this embodiment, the first aiming field 80 and the second aiming field 81 are printed on a synthetic resin sheet (not illustrated) by printing, and the printed sheet is attached to the screen of the monitor 78. Alternatively, the first aiming field 80 and the second aiming field 81 may be drawn with use of, for instance, the computer 79, and the computer 79 may control the screen of the monitor 78 to display the drawn images thereon.

The first aiming field 80 has substantially the same profile and size as the profile and size of a hole edge 42 of the relief hole 41 displayed on the screen of the monitor 78 when the camera 76 captures the hole edge 42 of the relief hole 41 provided to the sleeve 34. In this embodiment, the first aiming field 80 is substantially circular. In addition, the first aiming field 80 is located at substantially the center of the screen of the monitor 78 both in the up-and-down direction and the right-and-left direction.

The second aiming field 81 is substantially circular, whose diameter is smaller than that of the first aiming field 80. On the screen of the monitor 78, the center of the second aiming field 81 is set to be coincident with the center of the first aiming field 80 of substantially a circular shape. The second aiming field 81 is set such that the connecting efficiency of the optical fiber 18 and the optical device 27 is sufficiently secured if the optical device active layer 61 captured by the camera 76 and displayed on the screen of the monitor 78 is within the region defined by the second aiming field 81.

3. Known Technique

Next, an alignment method according to a known technique will be described with reference to FIGS. 4 to 9. FIG. 4 illustrates the alignment system 70 with the circuit board 13, the resin member 32 and the camera 76 attached. In FIG. 4, the relative positions of the circuit board 13 and the resin member 32 are opposite to those illustrated in FIGS. 1 and 2 with respect to the up-and-down direction.

Initially, the resin member 32 is held by the resin member holding mechanism 74. Then, the circuit board 13 is moved downward from a position above the resin member 32, and the board connectors 38 of the shield 35 are inserted into the through holes 51 of the circuit board 13. Subsequently, the circuit board 13 is held by the circuit board holding mechanism 72.

Next, the camera 76 is mounted on the camera holding mechanism 75. Then, the camera 76 is moved by the camera moving mechanism 82 in the up-and-down direction. While white light is applied, the camera 76 is adjusted such that its focal point is located on the optical fiber coupling plane 60 (i.e., the bottom surface of the sleeve 34). The white light may be light from an LED light device attached to the camera 76, or alternatively, the resin member 32, the circuit board 13 and the camera 76 may be irradiated with light from a light device separated from the alignment system 70.

Description will be made with respect to the significance of positioning the focal point of the camera 76 onto the optical fiber coupling plane 60. As described above, in the optical module 50 according to this embodiment, invisible light having a wavelength of 850 nm is used in the optical communication. Therefore, the lens 39 is set such that the invisible light transmitted through the lens 39 forms an image of the optical device active layer 61 at the optical fiber coupling plane 60. With this arrangement, the connecting efficiency of the optical fiber 18 and the optical device 27 is expectedly enhanced. In FIG. 4, the optical path of the invisible light is represented by dashed dotted lines.

However, according to the known technique, white light is used in aligning the sleeve 34 with the optical device 27. In FIG. 4, the light path of the white light transmitted through the lens 39 is represented by broken lines. The focal length differs depending on the wavelength, and the white light transmitted through the lens 39 forms an image of the optical device active layer 61 within the relief hole 41. Herein, an optical path difference L is the distance between the position where the image of the optical device active layer 61 is formed in the invisible light and the position where the image of the optical device active layer 61 is formed in the white light.

Figure 5:
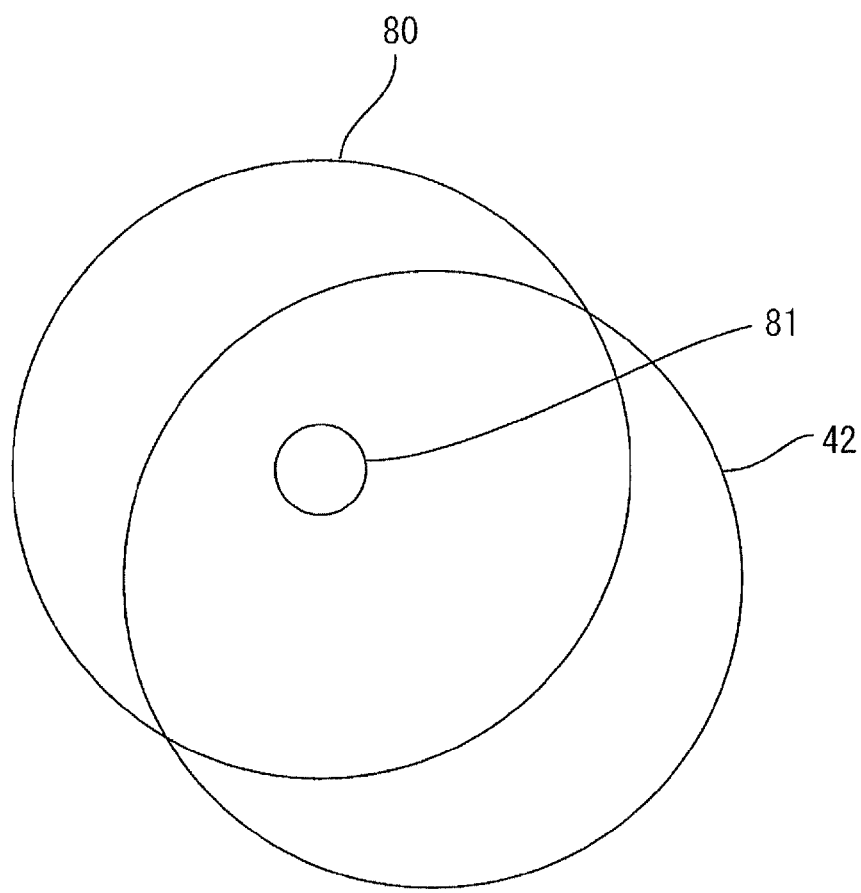
FIG. 5 schematically depicts an image displayed on a monitor screen according to the known technique.

The image captured by the camera 76 (i.e., the camera that has been adjusted such that its focal point is located on the optical fiber coupling plane 60) while being irradiated by the white light is displayed on the screen of the monitor 78. FIG. 5 illustrates an example of the image captured by the camera 76. The screen displays the first aiming field 80 and the second aiming field 81. The screen also displays the hole edge 42 of the relief hole 41 provided at the bottom surface of the sleeve 34.

With the white light transmitted through the lens 39, no image of the optical device active layer 61 is formed on the optical fiber coupling plane 60 (i.e., the bottom surface of the sleeve 34), and thus no such image is displayed on the screen.

At the region radially outside of the hole edge 42 of the relief hole 41, the inner wall surface and the bottom surface of the sleeve 34 are displayed. However, as described above, since the focal point of the camera 76 is adjusted to be located on the optical fiber coupling plane 60, the displayed image of the inner wall surface of the sleeve 34 is a defocused image. In addition, since the resin member 32 is made of a light-transmissive synthetic resin, the image of the bottom surface of the sleeve 34 is not clearly recognized.

At the region radially inside of the hole edge 42 of the relief hole 41, the inner lateral surface and the bottom surface of the relief hole 41 are displayed. However, since the focal point of the camera 76 is adjusted to be located on the optical fiber coupling plane 60, the displayed images of the inner lateral surface and the bottom surface of the relief hole 41 are defocused images.

In sum, on the screen of the monitor 78 as illustrated in FIG. 5, the light-transmissive synthetic resin (i.e., the material of the resin member 32) is displayed as a defocused image, and only the hole edge 42 of the relief hole 41 is displayed as a clear image.

Figure 6:
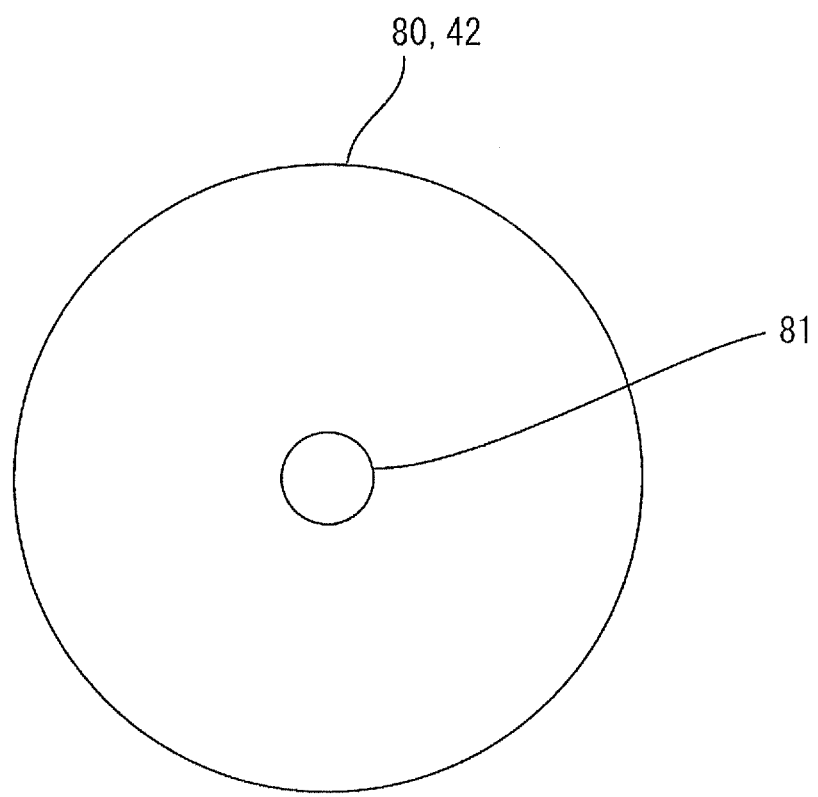
FIG. 6 schematically depicts a camera being positionally aligned with a resin member according to the known technique.

Subsequently, as illustrated in FIG. 6, the camera moving mechanism 82 moves the camera 76 in the horizontal direction such that the first aiming field 80 becomes coincident with the hole edge 42 of the relief hole 41 on the screen of the monitor 78. With this operation, the relative positions of the camera 76 and the resin member 32 are aligned.

Then, as illustrated in FIG. 7, the camera moving mechanism 82 moves the camera 76 by the optical path difference L in a direction toward the circuit board 13 (i.e., the upward direction). By this operation, the focal point of the camera 76 is brought into coincidence with a virtual plane where the image of the optical device active layer 61 is formed in the white light transmitted through the lens 39. In this state, the screen of the monitor 78 displays, for instance, an image illustrated in FIG. 8.

The screen of the monitor 78 displays the first aiming field 80, the second aiming field 81, and the image of the optical device active layer 61 formed in the white light. Since the focal point of the camera 76 has been moved upward by the optical path difference L, the hole edge 42 of the relief hole 41 is displayed as a defocused image. In other words, in this state, it is not possible to determine whether or not the relative positions of the camera 76 and the resin member 32 are in alignment. The relative positions of the camera 76 and the resin member 32 are dependent on the precision of the camera moving mechanism 82.

Figure 8:
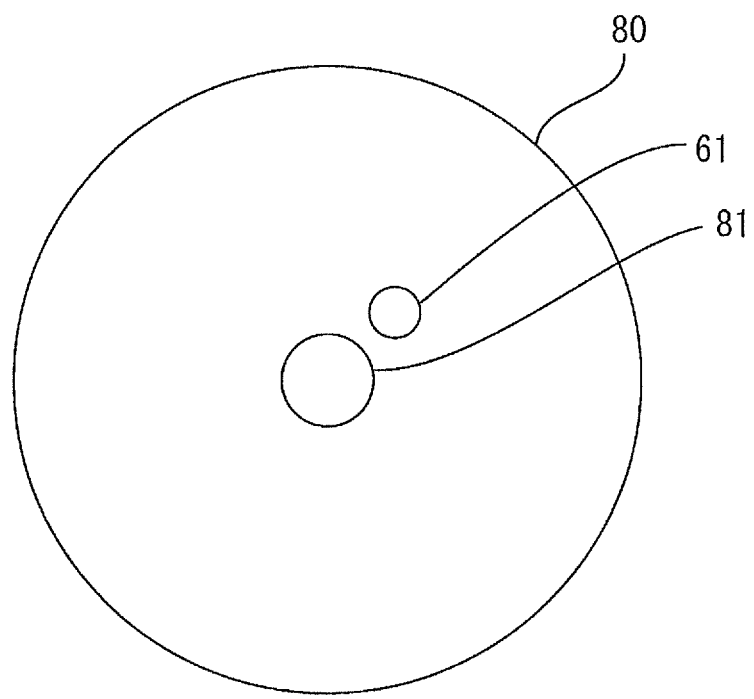
FIG. 8 schematically depicts an image displayed on a monitor screen according to the known technique.

In FIG. 8, the screen of the monitor 78 displays the light-transmissive synthetic resin (i.e., the material for the resin member 32) as a defocused image. When the optical device active layer 61 is formed flush with the surface of the optical device 27, the surface of the optical device 27 may also be displayed. However, when the optical device active layer 61 protrudes from or recesses in the surface of the optical device 27, the surface of the optical device 27 is displayed also as a defocused image. Further, the surface of the circuit board 13 on which the optical device 27 is mounted is displayed also as a defocused image.

In sum, when the focal point of the camera 76 is moved upward by the optical path difference L, the screen of the monitor 78 displays the light-transmissive synthetic resin (i.e., the material for the resin member 32), the optical device 27 and the circuit board 13 as defocused images, and only the optical device active layer 61 is displayed as a clear image.

Figure 9:
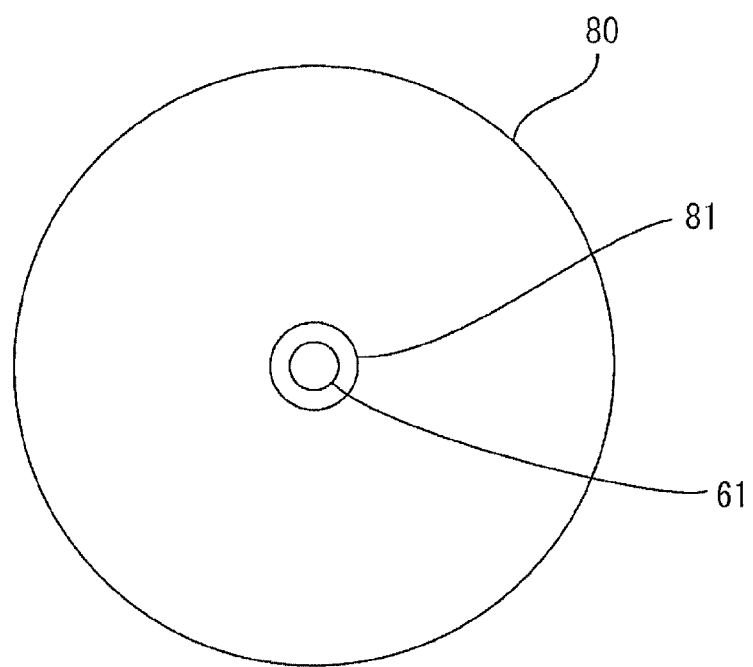
FIG. 9 schematically depicts the camera being positionally aligned with an optical device active layer according to the known technique.

Subsequently, as illustrated in FIG. 9, the circuit board moving mechanism 73 moves the circuit board 13 in the horizontal direction such that the image of the optical device active layer 61 is located within the region defined by the second aiming field 81 on the screen of the monitor 78. With this operation, the relative positions of the camera 76 and the circuit board 13 are aligned.

The inner diameter dimension of the through holes 51 of the circuit board 13 is set to avoid interference with the board connectors 38 of the shield 35 when the circuit board 13 is moved in the horizontal direction.

As described above, the relative positions of the camera 76 and the resin member 32 are aligned, and then the relative positions of the camera 76 and the circuit board 13 are aligned. With this operation, the relative positions of the resin member 32 and the circuit board 13 are aligned. Subsequently, as illustrated in FIG. 10, while maintaining thus aligned relative positions of the camera 76, the resin member 32, and the circuit board 13, the board connectors 38 of the shield 35 and the through holes 51 of the circuit board 13 are soldered together by a known method. Accordingly, in the known technique, with the relative positions of the resin member 32 and the circuit board 13 aligned, the resin member 32 and the circuit board 13 are fixed together.

(Problems in Known Technique)

In the below, problems in the known technique will be described. First of all, according to the known technique, after the relative positions of the camera 76 and the resin member 32 are aligned as illustrated in FIG. 6, the camera 76 is moved upward by the optical path difference L as illustrated in FIG. 7. Therefore, the operations thereof become complicated.

Figure 11:
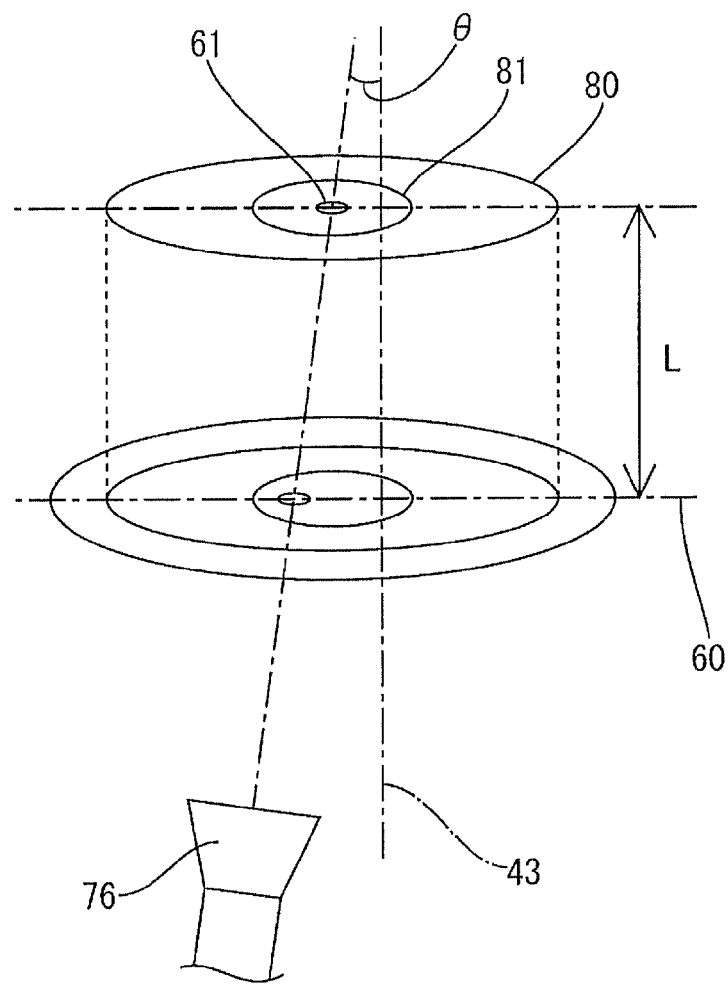
FIG. 11 schematically depicts the camera of which the optical axis is inclined with respect to the axis of a lens according to the known technique.

Further, when the camera 76 is moved, the position of the camera 76 may be displaced from and inclined with respect to, for instance, the axis 43 of the sleeve 34. With reference to FIG. 11, description will be made with respect to an example in which the optical axis of the camera 76 is displaced from the axis of the sleeve 34 by an angle θ when the camera 76 is moved upward. When the camera 76 is moved upward, the screen of the monitor 78 displays the hole edge 42 of the relief hole 41 only as a defocused image because the camera 76 is out of focus. Accordingly, an operator is not able to recognize that the camera 76 is displaced from the axis 43 of the sleeve 34.

In the above state, when the image of the optical device active layer 61 is aligned to be located within the region defined by the second aiming field 81 on the screen of the monitor 78, the actual position of the optical device active layer 61 relative to the optical fiber coupling plane 60 is displaced in the horizontal direction by the product of the optical path difference L multiplied by tangent θ. For instance, in a relationship between the white light and the invisible light having a wavelength of 850 nm, the optical path difference L is about 200 μm. If the camera 76 is displaced by, for instance, θ=1° from the axis 43 of the sleeve 34 in this state, the displacement of the optical device 27 in the horizontal direction will result in about 3.5 μm (as tangent 1° is about 0.017). In other words, according to the known technique, the displacement of the optical axis of the camera 76 from the axis 43 of the sleeve 34 by 1° will result in the displacement of the optical device 27 in the horizontal direction by about 3.5 μm. The horizontal displacement by about 3.5 μm is a relatively great displacement because the diameter of the optical device active layer 61 is about 10 μm. Therefore, it has been difficult to sufficiently enhance the precision in the position alignment of the resin member 32 and the optical device 27.

4. Embodiment

Next, an embodiment of the manufacturing method of the optical device 27 according to the aspect of the invention will be described with reference to FIGS. 12 to 15. The same configurations and the same steps as employed in the above known technique will not be described in duplicate.

Initially, as illustrated in FIG. 12, the circuit board 13, the resin member 32, and the camera 76 are mounted on the alignment system 70. Then, the camera 76 is moved by the camera moving mechanism 82 in the up-and-down direction. While the invisible light having a wavelength of 850 nm is applied from a light source (not illustrated), the camera 76 is adjusted such that its focal point is located on the optical fiber coupling plane 60 (i.e., the bottom surface of a sleeve 34). The optical path of the invisible light is represented by dashed dotted lines in FIG. 12.

Figure 13:
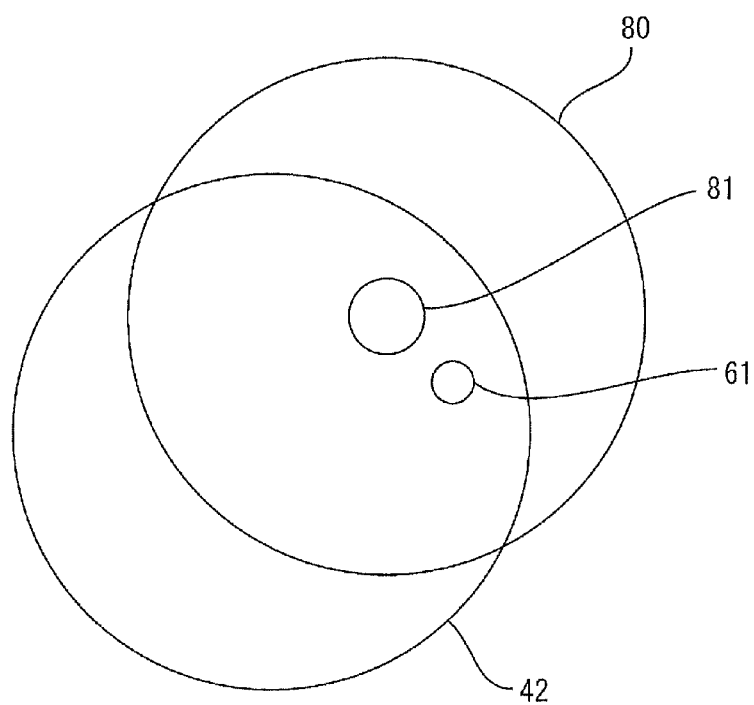
FIG. 13 schematically depicts an image displayed on a monitor screen according to the embodiment of the invention.

In this state, the screen of the monitor 78 displays, for instance, an image illustrated in FIG. 13. The screen of the monitor 78 displays the first aiming field 80, the second aiming field 81, the hole edge 42 of the relief hole 41, and an image of the optical device 27 active plane formed on the optical fiber coupling plane 60 in the invisible light transmitted through the lens 39. Specifically, according to this embodiment, the first aiming field 80 and the second aiming field 81 (i.e., the references for the position alignment), the hole edge 42 of the relief hole 41 provided at the resin member 32 (i.e., the object of the position alignment) and the optical device active layer 61 (i.e., the object of the position alignment) are all displayed as clear images on the same screen.

Figure 14:
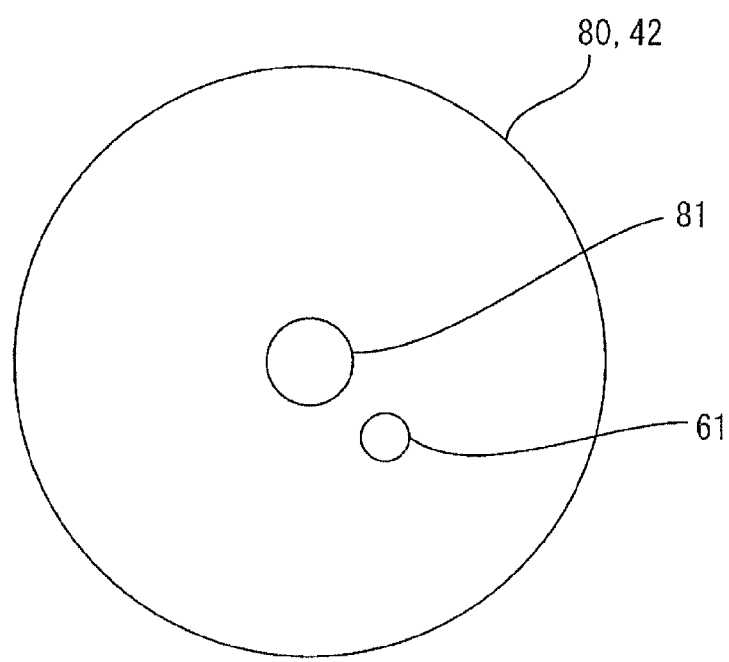
FIG. 14 schematically depicts a camera being positionally aligned with a resin member according to the embodiment of the invention.

Subsequently, as illustrated in FIG. 14, the camera moving mechanism 82 moves the camera 76 in the horizontal direction such that the first aiming field 80 becomes coincident with the hole edge 42 of the relief hole 41. With this operation, the relative positions of the camera 76 and the resin member 32 are aligned.

Figure 15:
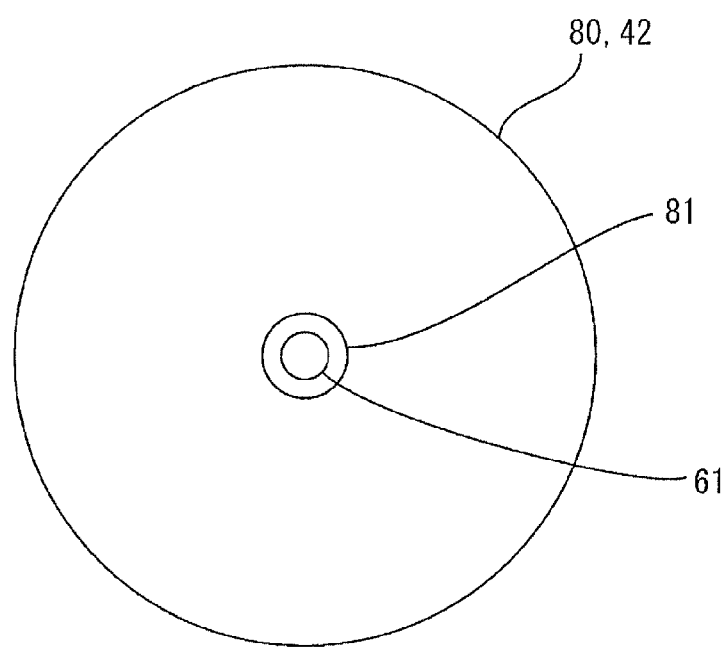
FIG. 15 schematically depicts the camera being positionally aligned with an optical device active layer according to the embodiment of the invention.

Then, as illustrated in FIG. 15, the circuit board moving mechanism 73 moves the circuit board 13 in the horizontal direction such that the optical device active layer 61 is located within the region defined by the second aiming field 81. By this operation, the relative positions of the camera 76 and the optical device active layer 61 are aligned. Through these operations, the alignment of the relative positions of the camera 76, the resin member 32 and the optical device active layer 61 is completed.

Thereafter, as illustrated in FIG. 16, while maintaining thus aligned relative positions of the camera 76, the resin member 32 and the optical device active layer 61, the board connectors 38 of the shield 35 and the through holes 51 of the circuit board 13 are soldered together by a known method. Accordingly, in this embodiment, with the relative positions of the resin member 32 and the circuit board 13 aligned, the resin member 32 and the circuit board 13 are fixed together.

(Effects and Advantages of the Embodiment)

In the following, effects and advantages of this embodiment will be described. According to this embodiment, by adjusting the focal point of the camera 76 to be located on the optical fiber coupling plane 60, an operator can, with use of the camera 76, observe the resin member 32 located at the optical fiber coupling plane 60 and the optical device active layer 61 whose image is formed on the optical fiber coupling plane 60 at the same time. Accordingly, since there is no need to change the focal point of the camera 76 during the position alignment, the number of operations is reduced.

In addition, since there is no need to move the camera 76, the camera 76 is hardly inclined with respect to the axis of the lens 39 during the position alignment. As the result, the displacement of the optical device active layer 61 and the resin member 32 from each other hardly occurs, and thus the precision in the position alignment of the optical device active layer 61 with the resin member 32 is enhanced.

Further according to this embodiment, the hole edge 42 of the relief hole 41 provided at the bottom surface of the sleeve 34 is observed during the position alignment. Therefore, there is no need to provide the resin member 32 with a dedicated structure for the position aligning step. Consequently, the structure of the resin member 32 is simplified, and the manufacturing cost is reduced.

In addition, this embodiment uses the invisible light having the same wavelength as that of the invisible light used in the optical communication in the position aligning step. Thus, the precision in the position alignment is enhanced as compared to a configuration in which the wavelength of the light used in the position aligning step differs from the wavelength of the light used in the optical communication.

Further, in this embodiment, the resin member 32 and the circuit board 13 are fixed together by a simple method of soldering the board connectors 38 of the shield 35 integrated by insert molding with the resin member 32 to the through holes 51 of the circuit board 13. Thus, the manufacturing cost is reduced.

<Second Embodiment>

1. Optical Module 150

Figure 17:
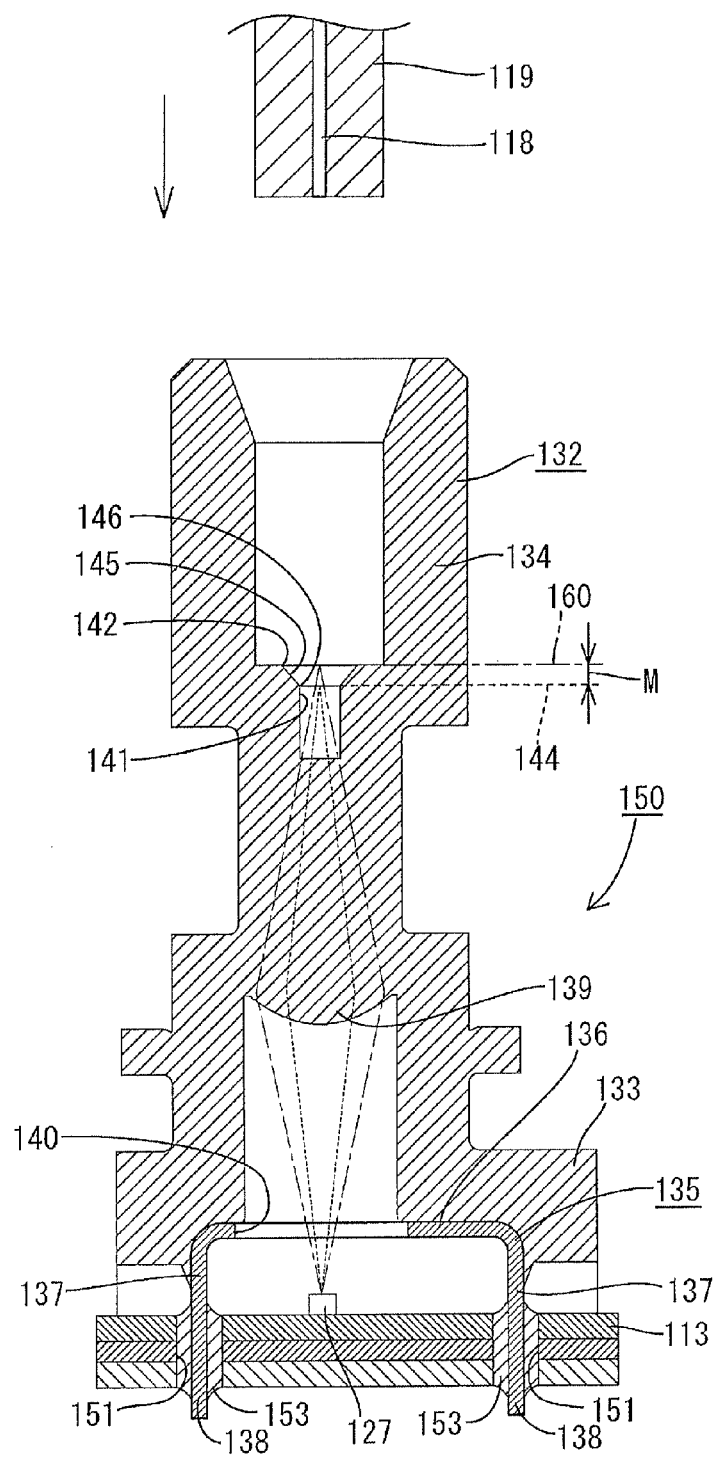
FIG. 17 is a cross-sectional view illustrating an optical module according to a second embodiment of the invention.

Initially, an optical module 150 according to a second embodiment of the invention will be described with reference to FIGS. 17 and 18. As illustrated in FIG. 17, the optical module 150 according to this embodiment includes an optical device 127 mounted on a circuit board 113 and a sleeve member 132 including a sleeve 134 attached to a plate surface of the circuit board 113. Into the sleeve 134, a ferrule 119 attached on the terminal of an optical fiber 118 is to be fitted.

(Circuit Board 113)

The circuit board 113 is provided with conduction paths (not illustrated) by printed wiring. On the top surface of the circuit board 113, the optical device 127 is connected to the conduction paths by a known technique such as reflow soldering. The optical device 127 is at least one of light emitting element and a light receiving element. The top surface of the optical device 127 is provided with an optical device active layer 161. The optical device active layer 161 converts an electric signal into an optical output or converts an optical output into an electric signal. In this embodiment, the optical device active layer 161 is substantially circular whose diameter is about 10 μm.

The circuit board 113 is provided with a plurality of through holes 151 extending through the circuit board 113 in an up-and-down direction. The inner circumferences of the through holes 151 are provided with conduction paths.

(Shield 135)

To the plate surface of the circuit board 113 on which the optical device 127 is mounted, a shield 135 is attached to cover the optical device 127. The shield 135 is provided by forming a metal plate member into a predetermined shape by press working. The shield 135 includes: a top plate 136; and side plates 137 extending from the top plate 136 toward the circuit board 113. Lower edges of the side plates 137 are provided with board connectors 138 extending downward. The board connectors 138 are inserted into the through holes 151 of the circuit board 113, and soldered with the conduction paths of the through holes 151 by a known method such as flow soldering. The through holes 151 are filled with solder 153 solidified after melted.

The inner diameters of the through holes 151 are set to be greater than the outer shapes of the board connectors 138. With this arrangement, the board connectors 138 before soldered with the through holes 151 are movable within the through holes 151 in a direction parallel to the plate surface of the circuit board 113.

(Sleeve Member 132)

To the plate surface of the circuit board 113 on which the optical device 127 is mounted, the sleeve member 132 is attached to cover the optical device 127. The sleeve member 132 is made of a light-transmissive synthetic resin (such as PEI, PC and PMMA). The sleeve member 132 includes a base 133 connected to the circuit board 113 and the sleeve 134 extending from the base 133 upward and into which the ferrule 119 attached on the terminal of the optical fiber 118 is to be inserted. The axis 143 of the sleeve 134 is substantially perpendicular to the plate surface of the circuit board 113. The "substantially perpendicular" means not only that the axis 143 of the sleeve 134 is perpendicular to the plate surface of the circuit board 113, but also that when the axis 143 of the sleeve 134 is not perpendicular to the plate surface of the circuit board 113, the axis 43 of the sleeve 34 is substantially perpendicular to the plate surface of the circuit board 13.

Figure 18:
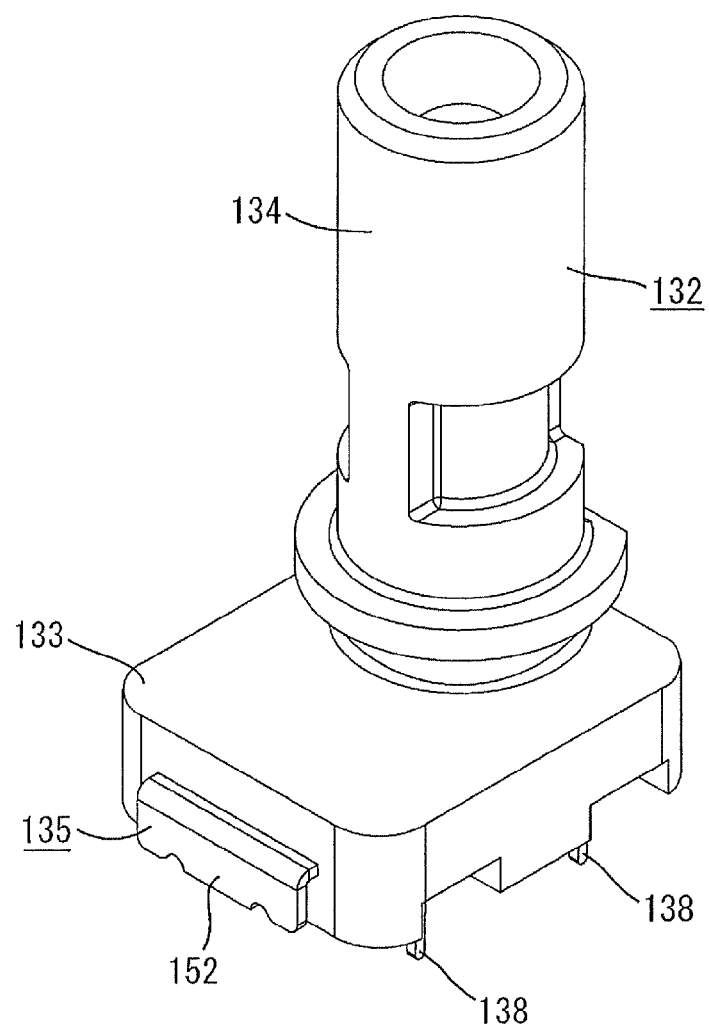
FIG. 18 is a perspective view illustrating a sleeve member.

As illustrated in FIG. 18, the base 133 is substantially rectangular when seen from the upside. The sleeve 134 is substantially tubular. The bottom surface of the sleeve 134 serves as an optical fiber coupling plane 160, at which the end surface of the optical fiber 118 is located when the ferrule 119 is inserted into a normal position inside the sleeve 134.

As illustrated in FIG. 17, the sleeve 134 is provided with a bottomed hole recessed from the bottom wall of the sleeve 134. The bottomed hole serves as a relief hole 141 for avoiding the interference with the optical fiber 118 inserted into the sleeve 134. The relief hole 141 is substantially circular in the cross section view.

The sleeve member 132 is integrally provided with a lens 139 on the optical path between the sleeve 134 and the optical device 127 and below the sleeve 134. The lens 139 bulges in the downward direction toward the circuit board 113. The lens 139 condenses and focuses the optical output from the optical fiber 118 on the optical device 127, and the lens 139 condenses and focuses the optical output from the optical device 127 on the lower end surface of the optical fiber 118.

In this embodiment, the light used in the optical communication is invisible light having a wavelength of 850 nm. The invisible light transmitted through the lens 139 forms an image of the optical device active layer 161 at the above-described optical fiber coupling plane 160.

The base 133 of the sleeve member 132 is integrated with the shield 135 by insert molding with use of a synthetic resin. A leg 152, which is an extension from the top plate 136 of the shield 135, protrudes outward from the base 133 of the sleeve member 132. The leg 152 is formed by bending the insert-molded shield 135 at a right angle in the downward direction (i.e., the direction toward the circuit board 113). The lower end edge of the leg 152 is substantially flush with the lower end edge of the sleeve member 132.

The top plate 136 of the shield 135 is provided with a window 140 on the optical path between the optical device 127 and the lens 139, and the window 140 extends through the top plate 136. The window 140 provides the optical path between the optical device 127 and the lens 139.

(Mark)

The hole edge 142 of the relief hole 141 is provided with a tapered surface 145 that reduces the inner diameter of the relief hole 141 from the hole edge 142 toward the bottom surface of the relief hole 141. Between the tapered surface 145 and the inner surface of the relief hole 141, a boundary 146 exists. The boundary 146 is one example of the mark.

The light passing through the lens 139 is refracted. The refractive index of the light depends on the wavelength thereof. For example, the refractive index of the invisible light having a wavelength of 850 nm is different from that of the white light. As the result, the invisible light having the wavelength of 850 nm forms an image of the optical device active layer 161 at the above-described optical fiber coupling plane 160 after transmitted through the lens 139. On the other hand, the white light forms an image of the optical device active layer 161 at a position closer to the optical device 127 than the optical fiber coupling plane 160 after transmitted through the lens 139. In this embodiment, the image of the optical device active layer 161 is formed within the relief hole 141. In FIG. 17, the optical path of the invisible light having the wavelength of 850 nm is represented by dashed dotted lines while the optical path of the white light is represented by broken lines. Herein, an optical path difference M is the distance between the optical fiber coupling plane 160 and an image forming plane 144.

As illustrated in FIG. 17, the image forming plane 144 is a virtual plane at which the image of the optical device active layer 161 is formed in the white light transmitted through the lens 139. The boundary 146 described above is provided at the position corresponding to the image forming plane 144.

The white light in this embodiment is at least visible light whose wavelength is different from that of the invisible light used in the optical communication.

2. Alignment System 170

Figure 19:
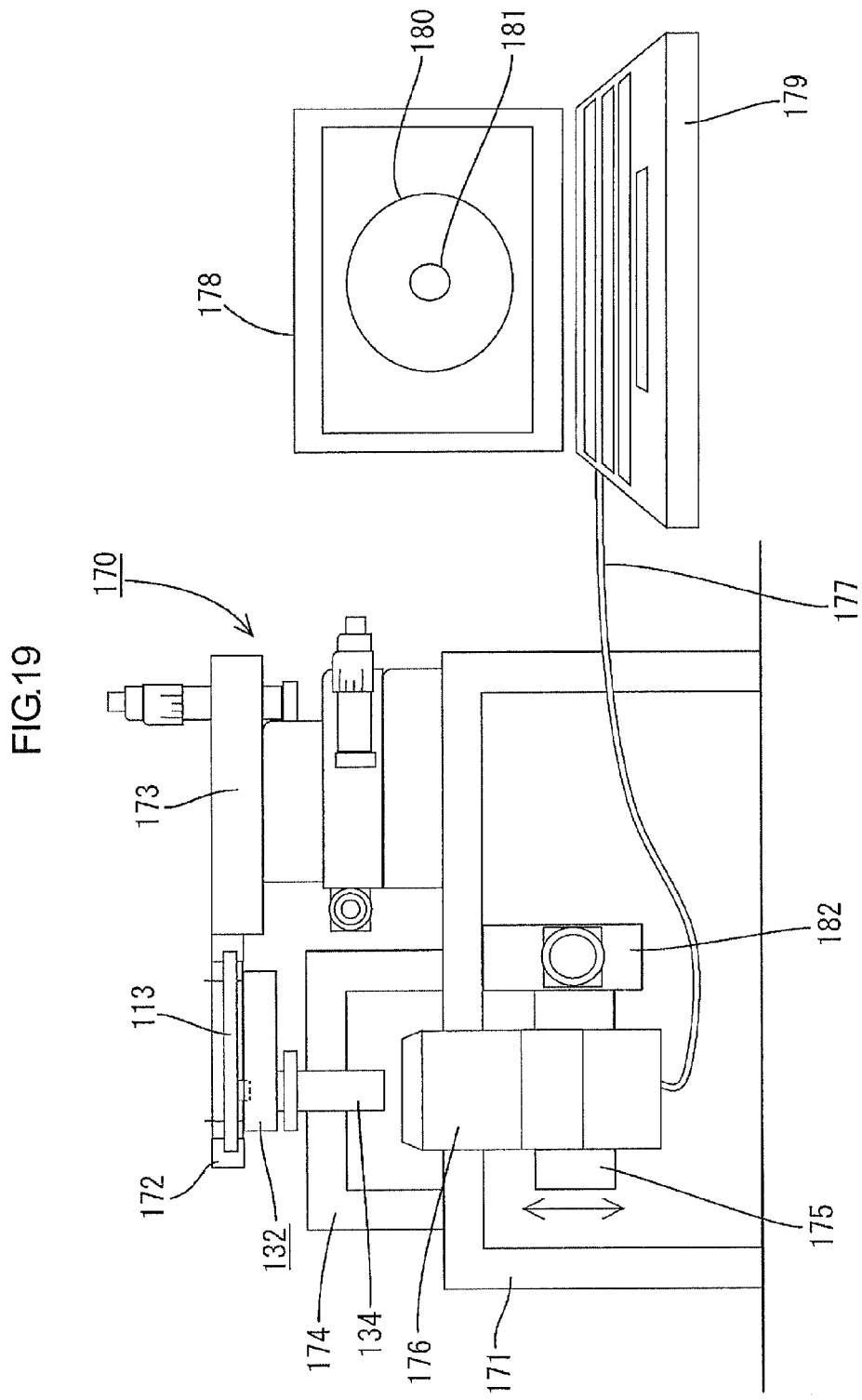
FIG. 19 depicts an alignment system.

Next, an alignment system 170 used in the manufacturing method according to the aspect of the invention will be described with reference to FIG. 19. A mount 171 is provided with a circuit board moving mechanism 173 moving the circuit board 113 held by a circuit board holding mechanism 172 in a direction parallel to the plate surface of the circuit board 113. The circuit board 113 is held by the circuit board holding mechanism 172 such that the plate surface of the circuit board 113 is in a horizontal position and the optical device 127 faces downward.

The mount 171 is also provided with a sleeve member holding mechanism 174 holding the sleeve member 132. The sleeve member 132 is held by the sleeve member holding mechanism 174 with the sleeve 134 downward and the base 133 upward. The sleeve member 132 is held by the sleeve member holding mechanism 174 such that the axis 143 of the sleeve 134 is vertical.

The mount 171 is further provided with a camera moving mechanism 182 configured to move a camera 176 held by a camera holding mechanism 175 in the vertical direction. The camera moving mechanism 182 is also configured to move the camera 176 in the horizontal direction. In this embodiment, a CCD camera is used as the camera 176. The camera 176, however, may be any other camera suitably selected depending on needs.

The camera 176 is connected to a monitor 178 via a cable 177. The monitor 178 displays images captured by the camera 176. In this embodiment, the monitor 178 is connected to a computer 179, and the camera 176 is connected to the computer 179 by the cable 177 described above. The monitor 178, however, may be any other monitor 178 suitably selected depending on needs, as long as the monitor 178 displays the images captured by the camera 176.

In this embodiment, the screen of the monitor 178 displays: a first aiming field 180 for use in aligning the relative positions of the camera 176 and the sleeve member 132; and a second aiming field 181 for use in aligning the relative positions of the camera 176 and the optical device active layer 161. In this embodiment, the first aiming field 180 and the second aiming field 181 are printed on a synthetic resin sheet (not illustrated) by printing, and the printed sheet is attached to the screen of the monitor 178. Alternatively, the first aiming field 180 and the second aiming field 181 may be drawn with use of, for instance, the computer 179, and the drawn images is displayed on the screen of the monitor 178 under control of the computer 179.

The first aiming field 180 has substantially the same profile and size as the profile and size of the hole edge 142 displayed on the screen of the monitor 178 when the camera 176 captures the hole edge 142 of the relief hole 141 provided at the sleeve 134. In this embodiment, the first aiming field 180 is substantially circular. In addition, the first aiming field 180 is located at substantially the center of the screen of the monitor 178 both in the up-and-down direction and the right-and-left direction.

The second aiming field 181 is substantially circular, whose diameter is smaller than that of the first aiming field 180. On the screen of the monitor 178, the center of the second aiming field 181 is coincident with the center of the first aiming field 180 of substantially a circular shape. The second aiming field 181 is set such that the connecting efficiency of the optical fiber 118 and the optical device 127 is sufficiently secured if the optical device active layer 161 captured by the camera 176 and displayed on the screen of the monitor 178 is within the region defined by the second aiming field 181.

3. Known Technique

Next, an alignment method according to a known technique will be described with reference to FIGS. 20 to 25. The same components as in the second embodiment will be denoted by the same reference signs, and will not be described. FIG. 20 illustrates the alignment system 170 with the circuit board 113, the sleeve member 132 and the camera 176 attached. In FIG. 20, the relative positions of the circuit board 113 and the sleeve member 132 are opposite to those illustrated in FIGS. 17 and 18 with respect to the up-and-down direction.

The optical module 150 according to the known technique differs from the optical module 150 according to the second embodiment in that the boundary 246 is not provided at the position corresponding to the image forming plane 144. In the sleeve member 132 according to the known technique, the boundary 246 is provided at a position closer to the bottom surface of the sleeve 134 than the image forming plane 144.

Initially, the sleeve member 132 is held by the sleeve member holding mechanism 174. Then, the circuit board 113 is moved downward from a position above the sleeve member 132, and the board connectors 138 of the shield 135 are inserted into the through holes 151 of the circuit board 113. Subsequently, the circuit board 113 is held by the circuit board holding mechanism 172.

Next, the camera 176 is mounted on the camera holding mechanism 175. Then, the camera 176 is moved by the camera moving mechanism 182 in the up-and-down direction. While white light is applied, the camera 176 is adjusted such that its focal point is located on an optical fiber coupling plane 160 (bottom surface of a sleeve 134). The white light may be light from an LED light device attached to the camera 176, or alternatively, the sleeve member 132, the circuit board 113, and the camera 176 may be irradiated with light from a light device separated from the alignment system 170.

Description will be made with respect to the significance of adjusting the camera 176 to locate the focal point onto the optical fiber coupling plane 160. As described above, in the optical module 150 according to this embodiment, the invisible light having a wavelength of 850 nm is used in the optical communication. Therefore, the lens 139 is configured such that the invisible light transmitted through the lens 139 forms an image of the optical device active layer 161 at the optical fiber coupling plane 160. With this arrangement, the connecting efficiency of the optical fiber 118 and the optical device 127 is expectedly enhanced. In FIG. 20, the optical path of the invisible light is represented by dashed dotted lines.

However, according to the known technique, white light is used in aligning the sleeve 134 with the optical device 127. In FIG. 20, the light path of the white light transmitted through the lens 139 is represented by broken lines. The focal length differs depending on the wavelength. Thus, the white light transmitted through the lens 139 forms an image of the optical device active layer 161 within the relief hole 141.

Figure 21:
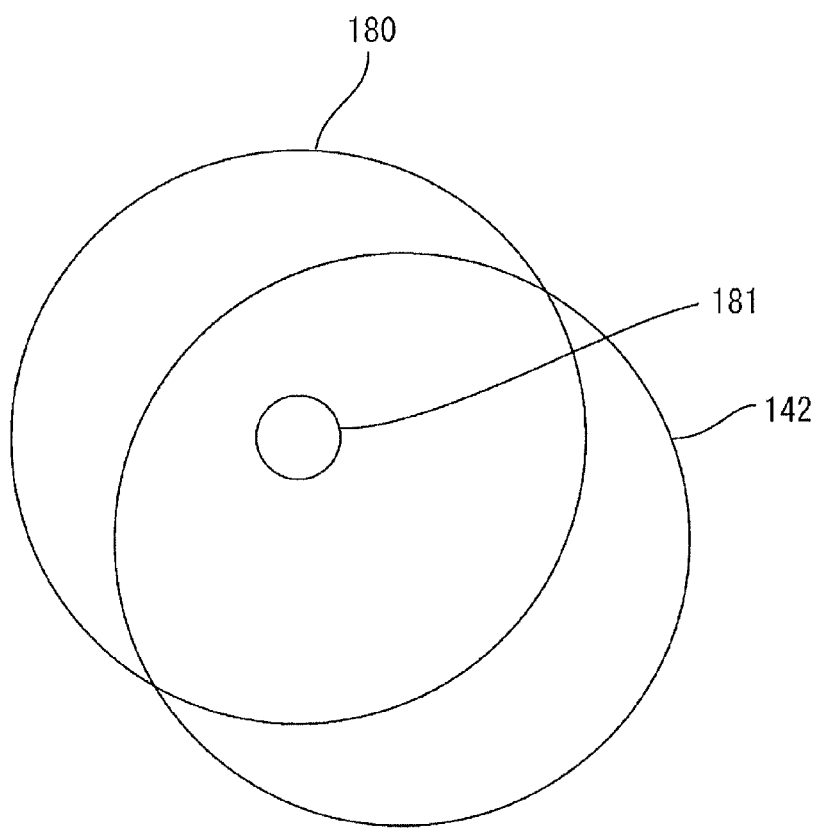
FIG. 21 schematically depicts an image displayed on a monitor screen according to the known technique.

The image captured by the camera 176 (i.e., the camera that has been adjusted such that its focal point is located on the optical fiber coupling plane 160) while being irradiated by the white light is displayed on the screen of the monitor 178. FIG. 21 illustrates an example of the image captured by the camera 176. The screen displays the first aiming field 180 and the second aiming field 181. The screen also displays the hole edge 142 of the relief hole 141 provided at the bottom surface of the sleeve 134.

In the white light transmitted through the lens 139, no image of the optical device active layer 161 is formed on the optical fiber coupling plane 160 (i.e., the bottom surface of the sleeve 134), and thus no such image is displayed on the screen.

At the radially outside region of the hole edge 142 of the relief hole 141, the inner wall surface and the bottom surface of the sleeve 134 are displayed. However, as described above, since the focal point of the camera 176 is adjusted to be located on the optical fiber coupling plane 160, the displayed image of the inner wall surface of the sleeve 134 is a defocused image. In addition, since the sleeve member 132 is made of a light-transmissive synthetic resin, the image of the bottom surface of the sleeve 134 is not clearly recognized.

At the radially inside region of the hole edge 142 of the relief hole 141, the inner lateral surface and the bottom surface of the relief hole 141 are displayed. However, since the focal point of the camera 176 is adjusted to be located on the optical fiber coupling plane 160, the displayed images of the inner lateral surface and the bottom surface of the relief hole 141 are defocused images.

In sum, on the screen of the monitor 178 as illustrated in FIG. 21, the light-transmissive synthetic resin (i.e., the material of the sleeve member 132) is displayed as a defocused image, and only the hole edge 142 of the relief hole 141 is displayed as a clear image.

Figure 22:
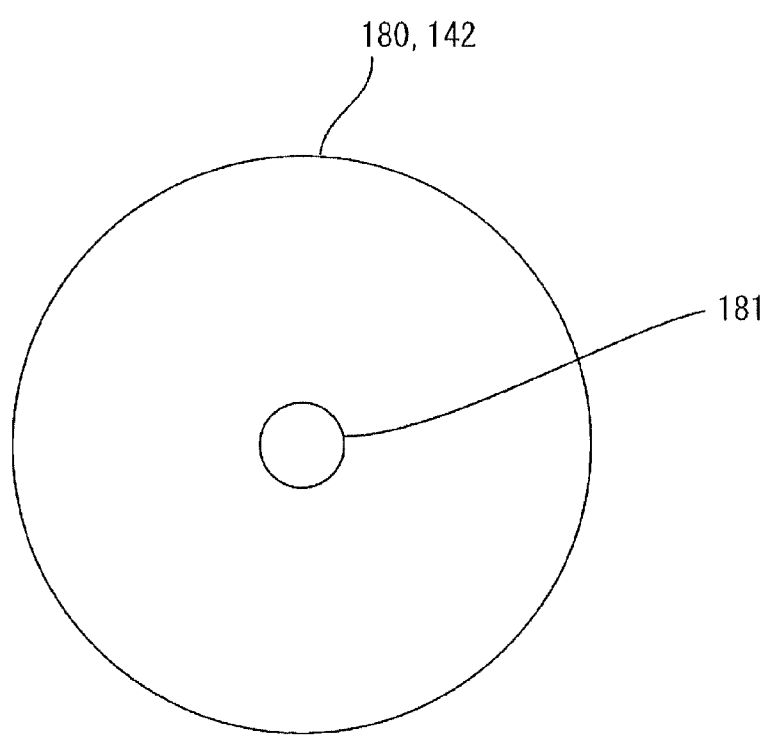
FIG. 22 schematically depicts a camera being positionally aligned with a sleeve member according to the known technique.

Subsequently, as illustrated in FIG. 22, the camera moving mechanism 182 moves the camera 176 in the horizontal direction such that the first aiming field 180 becomes coincident with the hole edge 142 of the relief hole 141 on the screen of the monitor 178. With this operation, the relative positions of the camera 176 and the sleeve member 132 are aligned.

Then, as illustrated in FIG. 23, the camera moving mechanism 182 moves the camera 176 by the optical path difference M in a direction toward the circuit board 113 (i.e., the upward direction). By this operation, the focal point of the camera 176 is located on a virtual plane where the image of the optical device active layer 161 is formed in the white light transmitted through the lens 139. In this state, the screen of the monitor 178 displays, for instance, an image illustrated in FIG. 24.

The screen of the monitor 178 displays the first aiming field 180, the second aiming field 181, and the image of the optical device active layer 161 formed in the white light. Since the focal point of the camera 176 has been moved upward by the optical path difference M, the hole edge 142 of the relief hole 141 is displayed as a defocused image. In other words, in this state, it is not possible to determine whether or not the relative positions of the camera 176 and the sleeve member 132 are aligned. The relative positions of the camera 176 and the sleeve member 132 are totally dependent on the precision of the camera moving mechanism 182.

Figure 24:
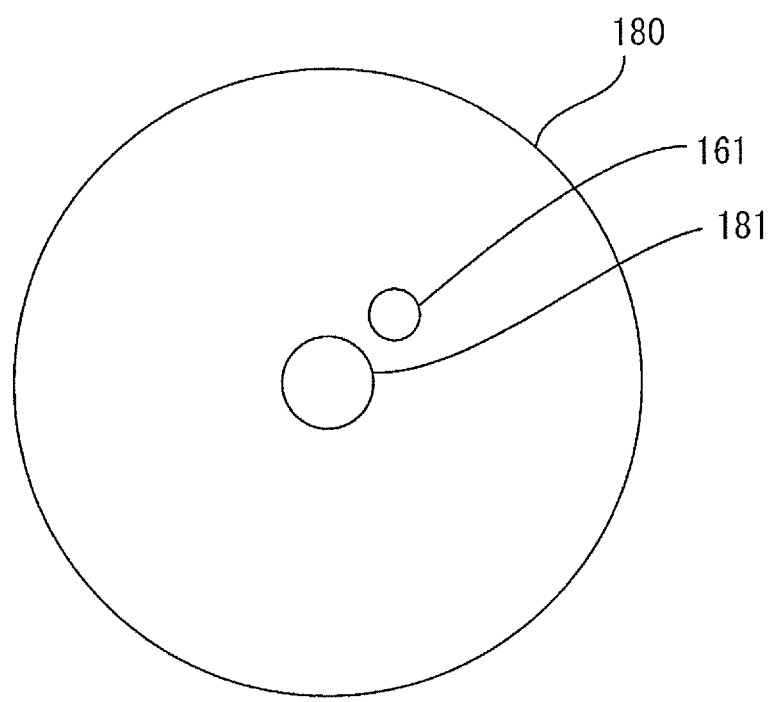
FIG. 24 schematically depicts an image displayed on a monitor screen according to the known technique.

In FIG. 24, the screen of the monitor 178 displays the light-transmissive synthetic resin (i.e., the material for the sleeve member 132) as a defocused image. When the optical device active layer 161 is formed flush with the surface of the optical device 127, the surface of the optical device 127 may also be displayed. However, when the optical device active layer 161 protrudes from or recesses in the surface of the optical device 127, the surface of the optical device 127 is displayed also as a defocused image. Further, the surface of the circuit board 113 on which the optical device 127 is mounted is also displayed as a defocused image.

In sum, when the focal point of the camera 176 is moved upward by the optical path difference M, the screen of the monitor 178 displays the light-transmissive synthetic resin (i.e., the material for the sleeve member 132), the optical device 127 and the circuit board 113 as defocused images, and only the optical device active layer 161 is displayed as a clear image.

Figure 25:
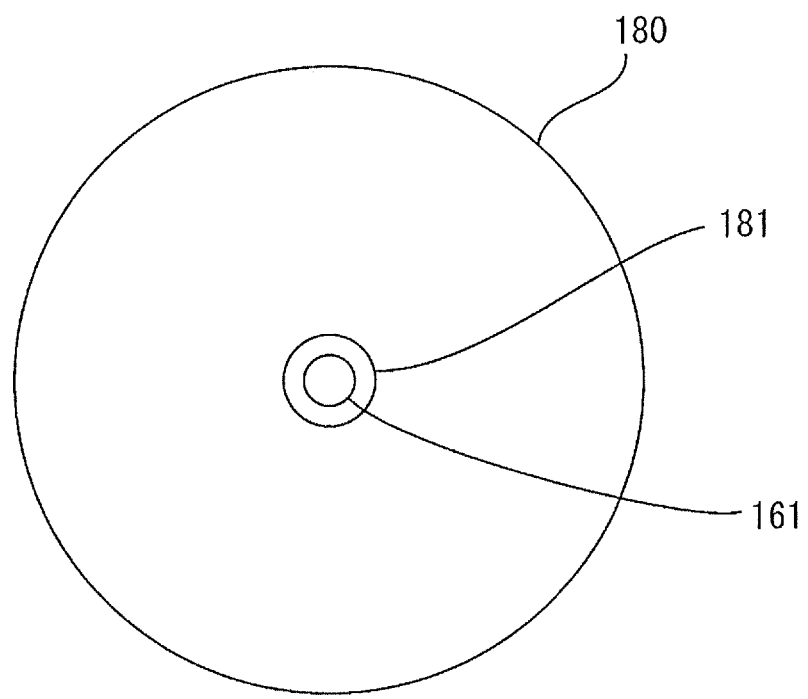
FIG. 25 schematically depicts the camera being positionally aligned with an optical device active layer according to the known technique.

Subsequently, as illustrated in FIG. 25, the circuit board moving mechanism 173 moves the circuit board 113 in the horizontal direction such that the image of the optical device active layer 161 is located within the region defined by the second aiming field 181 on the screen of the monitor 178. With this operation, the relative positions of the camera 176 and the circuit board 113 are aligned.

The inner diameter dimension of the through holes 151 of the circuit board 113 is set to avoid interference with the board connectors 138 of the shield 135 when the circuit board 113 is moved in the horizontal direction.

As described above, the relative positions of the camera 176 and the sleeve member 132 are aligned at first, and then the relative positions of the camera 176 and the circuit board 113 are aligned. With this operation, the relative positions of the sleeve member 132 and the circuit board 113 are aligned. Subsequently, as illustrated in FIG. 26, with the relative positions of the camera 176, the sleeve member 132 and the circuit board 113 maintained, the board connectors 138 of the shield 135 and the through holes 151 of the circuit board 113 are soldered together by a known method. Accordingly, in the known technique, with the relative positions of the sleeve member 132 and the circuit board 113 aligned, the sleeve member 132 and the circuit board 113 are fixed together.

(Problems in Known Technique)

In the description below, problems in the known technique will be described. First of all, according to the known technique, after the relative positions of the camera 176 and the sleeve member 132 are aligned as illustrated in FIG. 22, the camera 176 is moved upward by the optical path difference M as illustrated in FIG. 23. Therefore, the operations thereof may become complicated.

Figure 27:
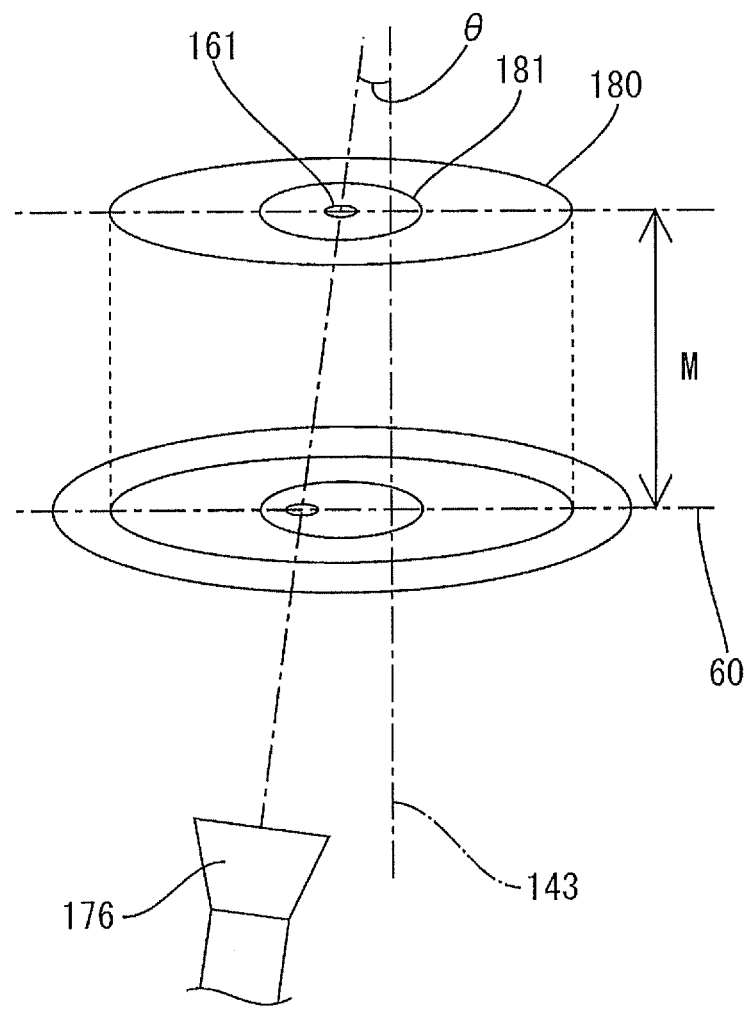
FIG. 27 schematically depicts the camera of which the optical axis is inclined with respect to the axis of a lens according to the known technique.

Further, when the camera 176 is moved, the position of the camera 176 may be displaced and inclined with respect to, for instance, the axis 143 of the sleeve 134. With reference to FIG. 27, description will be made with respect to an example in which the optical axis of the camera 176 is displaced from the axis 143 of the sleeve 134 by an angle θ when the camera 176 is moved upward. When the camera 176 is moved upward, the screen of the monitor 178 displays the hole edge 142 of the relief hole 141 only as a defocused image because the camera 76 is out of focus. Accordingly, an operator is not able to recognize that the camera 176 is displaced from the axis 143 of the sleeve 134.

In the above state, when the image of the optical device active layer 161 is located within the region defined by the second aiming field 181 on the screen of the monitor 178, the actual position of the optical device active layer 161 relative to the optical fiber coupling plane 160 is displaced in the horizontal direction by the product of the optical path difference M multiplied by tangent θ. For instance, in a relationship between the white light and the invisible light having a wavelength of 850 nm, the optical path difference M is about 200 μm. If the camera 176 is displaced by, for instance, θ=1° from the axis 143 of the sleeve 134 in this state, the displacement of the optical device 127 in the horizontal direction will be in the amount of about 3.5 μm (as tangent 1° is about 0.017). In other words, according to the known technique, the displacement of the optical axis of the camera 176 from the axis 143 of the sleeve 134 by 1° will result in the displacement of the optical device 127 in the horizontal direction by about 3.5 μm. The horizontal displacement by about 3.5 μm leads to a relatively great displacement because the diameter of the optical device active layer 161 is about 10 μm. Therefore, it has been difficult to sufficiently enhance the precision of the position alignment of the sleeve member 132 with the optical device 127.

4. Manufacturing Step of Optical Module According to Second Embodiment

In the following, an exemplary manufacturing step of the optical module 150 according to this embodiment will be described with reference to FIGS. 28 to 31. The same configurations and the same steps as employed in the above known technique will not be described in duplicate.

First of all, the circuit board 113, the sleeve member 132 and the camera 176 are mounted on the alignment system 170 as illustrated in FIG. 28. Then, the camera 176 is moved by the camera moving mechanism 182 in the up-and-down direction. While the white light is applied from a light source (not illustrated), the camera 176 is adjusted such that its focal point is located on the image forming plane 144. The optical path of the white light is represented by broken lines in FIG. 28.

Figure 29:
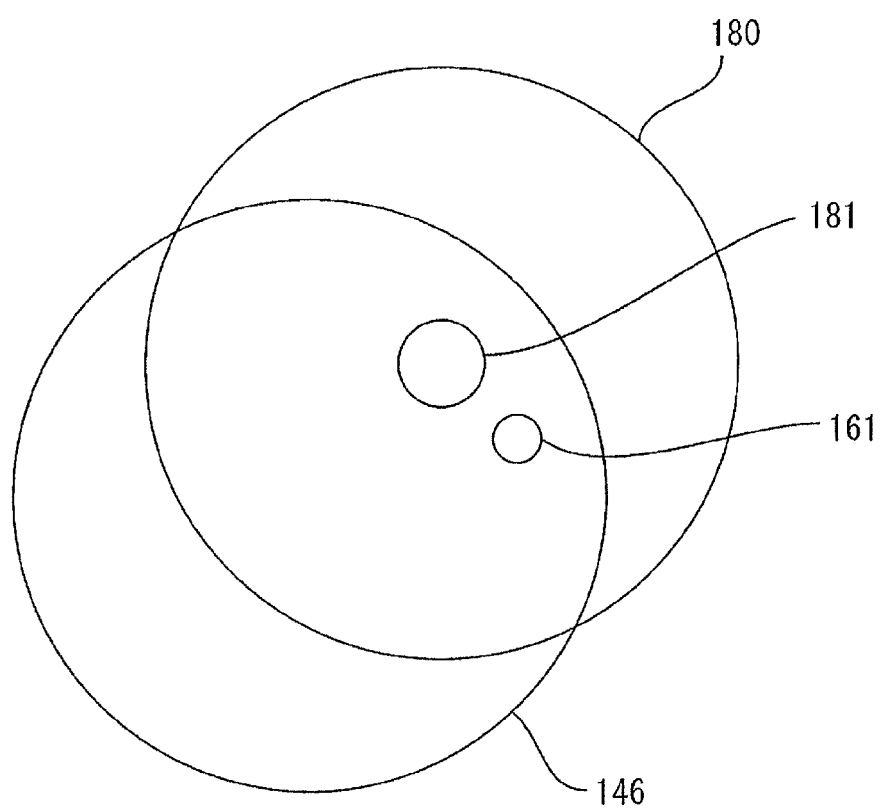
FIG. 29 schematically depicts an image displayed on a monitor screen according to the embodiment of the invention.

In this state, the screen of the monitor 178 displays, for instance, an image illustrated in FIG. 29. The screen of the monitor 178 displays the first aiming field 180, the second aiming field 181, the boundary 146 and the image of the optical device active layer 161 formed on the image forming plane 144 in the white light transmitted through the lens 139. Specifically, according to this embodiment, the first aiming field 180 and the second aiming field 181 (i.e., the references for the position alignment), the boundary 146 provided at the sleeve member 132 (i.e., the object of the position alignment) and the optical device active layer 161 (i.e., the object of the position alignment) are all displayed as clear images on the same screen.

Figure 30:
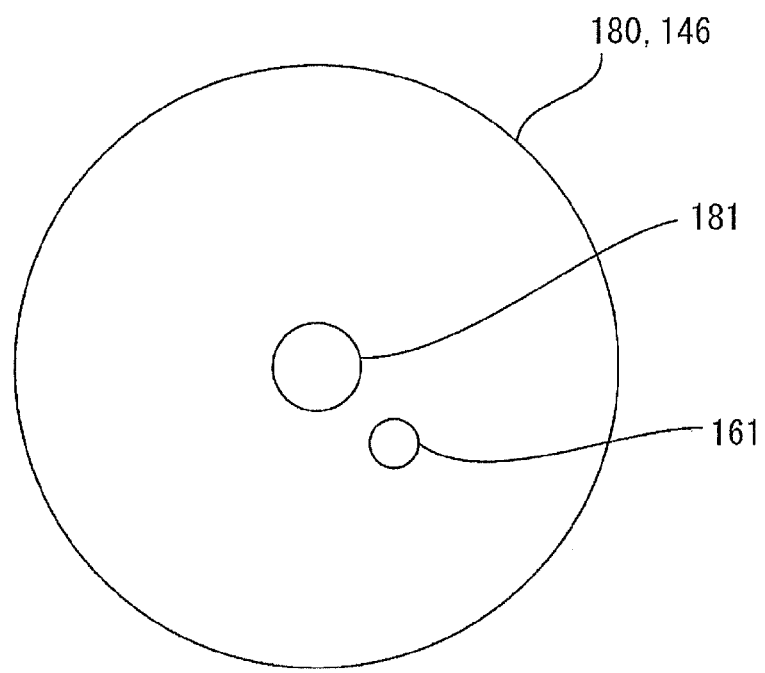
FIG. 30 schematically depicts a camera being positionally aligned with the sleeve member according to the embodiment of the invention.

Subsequently, the camera moving mechanism 182 moves the camera 176 in the horizontal direction such that the first aiming field 180 becomes coincident with the boundary 146 as illustrated in FIG. 30. With this operation, the relative positions of the camera 176 and the sleeve member 132 are aligned.

Figure 31:
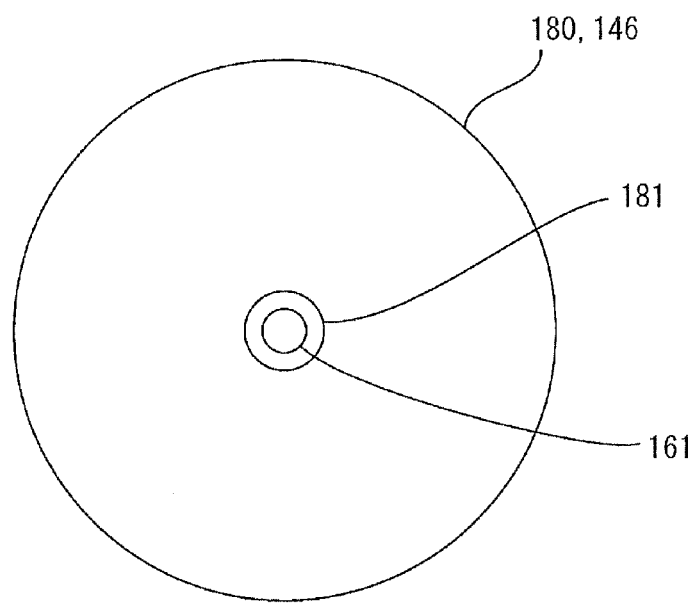
FIG. 31 schematically depicts the camera being positionally aligned with an optical device active layer according to the embodiment of the invention.

Then, the circuit board moving mechanism 173 moves the circuit board 113 in the horizontal direction such that the image of the optical device active layer 161 is located within the region defined by the second aiming field 181 as illustrated in FIG. 31. By this operation, the relative positions of the camera 176 and the optical device active layer 161 are aligned. Through these operations, the alignment of the relative positions of the camera 176, the sleeve member 132 and the optical device active layer 161 is completed.

Thereafter, as illustrated in FIG. 32, with the relative positions of the camera 176, the sleeve member 132 and the optical device active layer 161 maintained, the board connectors 138 of the shield 135 and the through holes 151 of the circuit board 113 are soldered together by a known method. Accordingly, in this embodiment, with the relative positions of the sleeve member 132 and the circuit board 113 aligned, the sleeve member 132 and the circuit board 113 are fixed together.

(Effects and Advantages of the Embodiment)

In the description that follows, effects and advantages of this embodiment will be described. According to this embodiment, by adjusting the focal point of the camera 176 to be located on the image forming plane 144, an operator can, with use of the camera 176, observe the boundary 146 located at the image forming plane 144 and the optical device active layer 161 whose image is formed on the image forming plane 144, at the same time. Accordingly, since there is no need to change the focal point of the camera 176 during the position alignment, the number of operations is reduced.

In addition, since there is no need to move the camera 176, the camera 176 is hardly inclined with respect to the axis of the lens 139 during the position alignment. As the result, the displacement of the optical device active layer 161 and the sleeve member 132 from each other hardly occurs, and thus the precision in the position alignment of the optical device active layer 161 with the sleeve member 132 is enhanced.

Further, according to this embodiment, the boundary 146 provided inside the relief hole 141 is observed during the position alignment. Therefore, there is no need to provide the sleeve member 132 with a dedicated structure for the position alignment. Consequently, the structure of the sleeve member 132 is simplified, and the manufacturing cost is reduced.

According to this embodiment, the boundary 146 between the tapered surface 145 provided on the hole edge 142 of the relief hole 141 and the inner lateral surface of the relief hole 141 serves as the mark. With this arrangement, by simply providing the tapered surface 145, the mark used for aligning the positions of the sleeve member 132 and the optical device 127 is formed.

According to this embodiment, the invisible light used in the optical communication is not used. Thus, there is no need for the light source for the invisible light, and the manufacturing cost is reduced.

Further, in this embodiment, the sleeve member 132 and the circuit board 113 are fixed together by a simple method of soldering the board connectors 138 of the shield 135 integrated with the sleeve member 132 by insert molding to the through holes 151 of the circuit board 113. Thus, the manufacturing cost is reduced.

<Third Embodiment>

Figure 33:
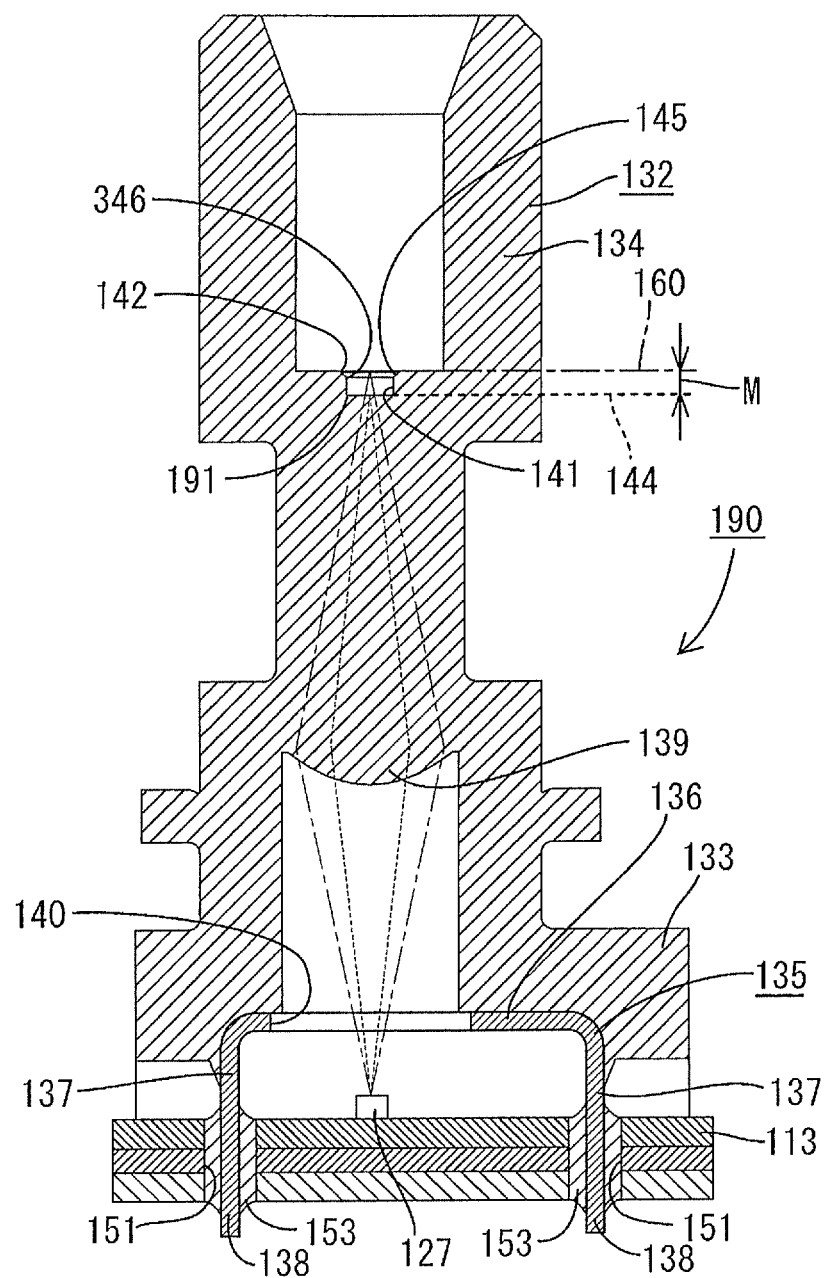
FIG. 33 is a cross-sectional view illustrating an optical module according to a third embodiment of the invention.

In the next description, a third embodiment of the invention will be described with reference to FIG. 33. In an optical module 190 according to this embodiment, the bottom surface of the relief hole 141 on the sleeve member 132 is provided at a position corresponding to the image forming plane 144. Accordingly, the boundary between the bottom surface of the relief hole 141 and the inner lateral surface of the relief hole 141 serves as the mark 191, for example.

In the sleeve member 132, the boundary 346 is not provided at the position corresponding to the image forming plane 144. More specifically, the boundary 346 is provided closer to the bottom surface of the sleeve 134 than the image forming plane 144 (i.e., the upper side in FIG. 33). The structure of the third embodiment is substantially the same as that of the second embodiment except for the above. Thus, the same components as in the second embodiment will be denoted by the same reference signs, and will not be described.

In this embodiment, the boundary between the bottom surface of the relief hole 141 and the inner lateral surface of the relief hole 141 serves as the mark 191. With this arrangement, an operator can align the position of the camera 176 with the position of the sleeve member 132 by relatively aligning the position of the mark 191 with the position of the first aiming field 180.

As described above, in this embodiment, by simply positioning the bottom surface of the relief hole 141 corresponding to the image forming plane 144, the mark 191 is provided. Therefore, the structure of the sleeve member 132 is further simplified.

<Fourth Embodiment>

Figure 34:
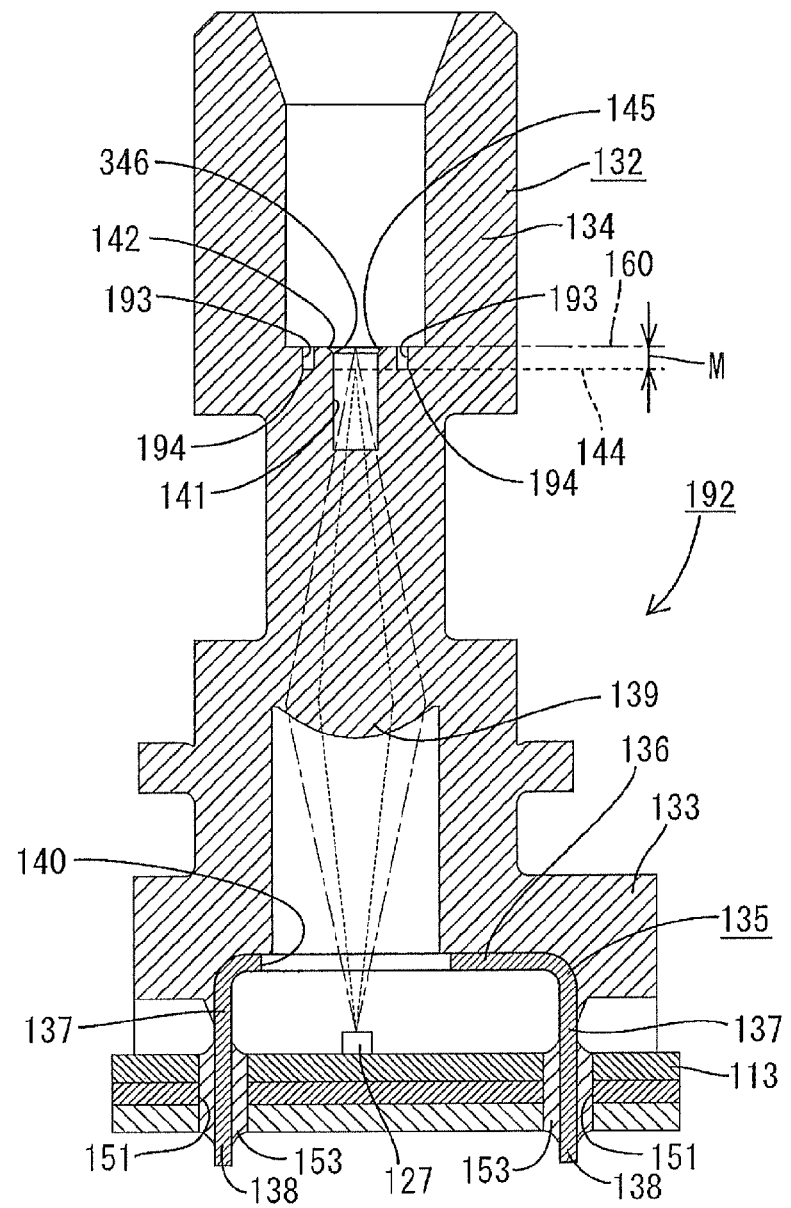
FIG. 34 is a cross-sectional view illustrating an optical module according to a fourth embodiment of the invention.

Next, a fourth embodiment of the invention will be described with reference to FIG. 34. In an optical module 192 according to this embodiment, a recess 193 is provided at a position different from the position of the relief hole 141 by recessing the bottom surface of the sleeve 134. The bottom surface of the recess 193 is provided at a position corresponding to the image forming plane 144. Accordingly, the boundary between the bottom surface of the recess 193 and the inner lateral surface of the recess 193 serves as the mark 194, for example.

In the sleeve member 132, the boundary 346 is not provided at the position corresponding to the image forming plane 144. More specifically, the boundary 346 is provided closer to the bottom surface of the sleeve 134 than the image forming plane 144 (i.e., the upper side in FIG. 34). The structure of the fourth embodiment is substantially the same as that of the second embodiment except for the above. Thus, the same components as in the second embodiment will be denoted by the same reference signs, and will not be described.

In this embodiment, the boundary between the bottom surface of the recess 193 and the inner lateral surface of the recess 193 serves as the mark 194. With this arrangement, an operator can align the position of the camera 176 with the position of the sleeve member 132 by relatively aligning the position of the mark 194 with the position of the first aiming field 180.

The recess 193 is provided at the position different from the position of the relief hole 141. Therefore, although the relief hole 141 needs to be provided at a position corresponding to the end surface of the optical fiber 118, the positioning of the recess 193 is relatively less restricted. As the result, by forming the recess 193 at a position easy for an operator to observe, the position alignment of the optical device 127 and the sleeve member 132 is easily conducted.

<Other Embodiments>

The invention is not limited to the embodiments described in the above description and illustrated in the attached drawings, but also includes, for example, the following embodiments in its technical scope.

(1) While the hole edge 42 of the relief hole 41 is observed in the first embodiment, the configuration is not limited thereto. Any structures such as rib or recess suitably selected depending on needs may be provided to the resin member 32 at the position corresponding to the optical fiber coupling plane 60, and such structures may be observed during the position aligning step.

(2) While the invisible light having the wavelength of 850 nm is used in the first embodiment, the invention is not limited thereto. Invisible light of any wavelength such as wavelength of 1.3 μm or 1.55 μm suitably selected depending on needs may be used, as long as such invisible light is used in the optical communication.

(3) While the resin member 32 and the circuit board 13 are fixed together by soldering in the first embodiment, the invention is not limited thereto. The resin member 32 and the circuit board 13 may be jointed together by an adhesive, or alternatively, may be screwed together. In other words, the resin member 32 and the circuit board 13 may be fixed together by any method suitably selected depending on needs.

(4) While the mark is provided by the boundary 146, the boundary between the bottom surface and the inner lateral surface of the relief hole 141, and the boundary between the bottom surface and the inner lateral surface of the recess in the second to fourth embodiments, the invention is not limited thereto. Any structures suitably selected depending on needs, such as rib or projection, may be provided to the sleeve member 132 at the position corresponding to the image forming plane 144, and such structures may be observed during the position aligning step.

(5) While the position aligning step is conducted with use of the white light in the second to fourth embodiments, the invention is not limited thereto. Visible light having any wavelength suitably selected depending on needs, for example monochromatic light, may be used, as long as such visible light has a wavelength different from that of the invisible light used in the optical communication.

(6) While the sleeve member 132 and the circuit board 113 are fixed together by soldering in the second to fourth embodiments, the invention is not limited thereto. The sleeve member 132 and the circuit board 113 may be jointed together by an adhesive, or alternatively, may be screwed together. In other words, the sleeve member 132 and the circuit board 113 may be fixed together by any method suitably selected depending on needs.

(7) While the shield 135 is formed by insert molding with use of a synthetic resin in the second to fourth embodiments, the invention is not limited thereto. The shield 135 may be formed separately from the sleeve member 132, and separately fixed to the circuit board 113.

Explanation of Symbols

13 . . . circuit board
18 . . . optical fiber
19 . . . ferrule
27 . . . optical device
32 . . . resin member
34 . . . sleeve
35 . . . shield
38 . . . board connector
39 . . . lens
41 . . . relief hole
42 . . . hole edge
50 . . . optical module
53 . . . solder
60 . . . optical fiber coupling plane
61 . . . optical device active layer
76 . . . camera
70 . . . alignment system
113 . . . circuit board
118 . . . optical fiber
119 . . . ferrule
127 . . . optical device
132 . . . sleeve member
134 . . . sleeve
135 . . . shield
138 . . . board connector
139 . . . lens
141 . . . relief hole
146, 346 . . . boundary
150, 190, 192 . . . optical module
153 . . . solder
160 . . . optical fiber coupling plane
161 . . . optical device active layer
176 . . . camera
170 . . . alignment system
191, 193 . . . mark The technology disclosed in the specification is described below.

An aspect of the technology disclosed in the specification provides a method of manufacturing an optical module including a circuit board on which an optical device is mounted, and a resin member disposed on the circuit board and formed of a light-transmissive synthetic resin. In the optical module, the resin member includes a sleeve into which a ferrule fitted around a terminal of an optical fiber is to be inserted, and a lens formed integrally with and on an axis of the sleeve. Further in the optical module, the optical device includes an optical device active layer adapted to emit or receive invisible light having a single wavelength used in optical communication, and the lens is configured such that the invisible light transmitted through the lens forms an image of the optical device active layer at an optical fiber coupling plane. The optical fiber coupling plane is a plane at which an end surface of the optical fiber is located when the ferrule is inserted into a normal position inside the sleeve. The method includes the steps of position aligning through which relative positions of the resin member and the circuit board are aligned by observing the resin member located at the optical fiber coupling plane and the optical device active layer whose image is formed at the optical fiber coupling plane , with use of a camera, while applying the invisible light onto the resin member and the optical device, and fixing through which the resin member is fixed to the circuit board while maintaining the aligned relative positions of the resin member and the circuit board.

According to the aspect of the technology disclosed in the specification, by adjusting the camera such that its focal point is located on the optical fiber coupling plane, an operator can observe, with use of the camera, the resin member located at the optical fiber coupling plane and the optical device active layer whose image is formed at the optical fiber coupling plane, at the same time. Therefore, since there is no need to move the camera to change the position of the focal point thereof in the position aligning step, the camera is prevented from being inclined with respect to the axis of the lens during the position aligning step. As the result, the displacement of the optical device active layer and the resin member from each other is prevented, and thus the position precision in aligning the optical device active layer and the resin member is enhanced.

The following configurations are preferable as the embodiments according to the present technology disclosed in the specification.

In the method according to the aspect of the technology disclosed in the specification, a bottom surface of the sleeve may serve as the optical fiber coupling plane and may include a relief hole which is recessed from the bottom surface at a position corresponding to the end surface of the optical fiber when the ferrule is inserted. The relief hole is configured to escape the end surface of the optical fiber. The relative positions of the resin member and the circuit board may be aligned by observing a hole edge of the relief hole during the position aligning step.

According to the above configuration, the hole edge of the relief hole provided at the bottom surface of the sleeve is observed during the position aligning step. Therefore, there is no need to provide the resin member with a dedicated structure for the position alignment. Consequently, the structure of the resin member is simplified, and the manufacturing cost is reduced.

The position aligning step may be conducted with application of the invisible light having a wavelength of 850 nm.

According to the above configuration, by using the invisible light having the same wavelength as that of the invisible light used in optical communication in the position aligning step, the precision in the position alignment is enhanced as compared to a configuration in which the wavelength of the light used in the position aligning step differs from the wavelength of the light used in the optical communication.

The resin member may include a metal shield integrated with the resin member by insert molding with use of the synthetic resin. The shield may include a board connector protruding toward the circuit board and connected to conduction paths provided to the circuit board. The metal shield covers the optical device. The fixing step may be conducted by soldering the board connector to the conduction paths.

According to the above configuration, the resin member and the circuit board are fixed together by a simple method of soldering, and thus the manufacturing cost is reduced.

Another aspect of the technology disclosed in the specification provides an optical module including an optical device mounted on a circuit board, and a sleeve member disposed on the circuit board to cover the optical device and formed of a light-transmissive synthetic resin. The sleeve member has a sleeve in which a ferrule fitted around a terminal of an optical fiber is to be inserted. In the optical module, the sleeve member includes a lens on an axis of the sleeve, and the optical device includes an optical device active layer configured to emit or receive invisible light having a single wavelength used in optical communication. Further in the optical module, the lens is configured such that the invisible light transmitted through the lens forms an image of the optical device active layer at an optical fiber coupling plane where an end surface of the optical fiber is located when the ferrule is inserted into a normal position inside the sleeve. In the optical module, the sleeve member is provided with a visually recognizable mark at a position corresponding to an image forming plane where an image of the optical device is formed by the visible light transmitted through the lens when the visible light having a wavelength different from the wavelength of the invisible light is applied.

According to the aspect of the technology disclosed in the specification, when the visible light is applied onto the optical device and the sleeve member, an image of the optical device active layer is formed at the image forming plane. Also, the sleeve member is provided with the mark at the position corresponding to the image forming plane. With this configuration, by observing the image forming plane with use of an observation device such as camera, an operator can observe the image of the optical device active layer formed on the image forming plane and the mark formed at the image forming plane at the same time. As the consequence, by aligning the positions of the optical device active layer and the mark, the position of the optical device having the optical device active layer is aligned with the position of the sleeve member having the mark. Accordingly, according to the aspect of the technology disclosed in the specification, there is no need to move the observation device, and thus the precision in the position alignment of the optical device and the sleeve member is enhanced.

The following configurations are preferable as the embodiments according to the present technology disclosed in the specification.

In the optical module according to the aspect of the technology disclosed in the specification, the sleeve member may include a metal shield integrated with the sleeve member by insert molding with use of the synthetic resin to cover the optical device. The shield includes a window on an optical path between the optical device and the lens. The window extends through the shield. Further in the optical module, the shield further may include a board connector protruding toward the circuit board and connected to conduction paths provided to the circuit board, and the board connector may be soldered to the conduction paths provided to the circuit board.

According to the above configuration, by a simple method of soldering, the sleeve member is disposed on the circuit board.

The sleeve member may include a relief hole recessed from a bottom surface of the sleeve. The relief hole is configured to avoid interference with the end surface of the optical fiber inserted in the sleeve, and the mark may be provided at an inner surface of the relief hole.

According to the above configuration, the relief hole may be provided with the mark at the inner surface thereof. Thus, the structure of the sleeve member is simplified as compared to a structure in which the mark is provided at a position different from the position of the relief hole.

A hole edge of the relief hole may be provided with a tapered surface such that a diameter of the relief hole decreases toward a bottom surface of the relief hole, and a boundary between the tapered surface and an inner wall surface of the relief hole may be located corresponding to the image forming plane.

According to the above configuration, the boundary between the tapered surface and the inner wall surface of the relief hole serves as the mark. Therefore, with a simple structure in which the hole edge of the relief hole is provided with the tapered surface, the mark is formed.

A bottom surface of the relief hole may be located at a position corresponding to the image forming plane.

According to the above configuration, the boundary between the bottom surface of the relief hole and the inner lateral surface of the relief hole serves as the mark. Thus, the structure of the sleeve member is further simplified.

The sleeve member may include a recess recessed from a bottom surface of the sleeve, and a bottom surface of the recess may be located at a position corresponding to the image forming plane.

According to the above configuration, the boundary between the bottom surface and the inner lateral surface of the recess serves as the mark. As the result, by forming the recess at a position easy for an operator to observe, the position alignment of the optical device and the sleeve member is easily conducted.

The invention claimed is:

1. A method of manufacturing an optical module, the optical module including: a circuit board; an optical device mounted on the circuit board; and a resin member arranged on the circuit board and formed of a light-transmissive synthetic resin, wherein:
the resin member includes:
a sleeve configured to receive a ferrule fitted around a terminal of an optical fiber; and
a lens formed integrally with and located on an axis of the sleeve,
the optical device includes an optical device active layer adapted to emit or receive invisible light having a single wavelength of between 800 nm and 900 nm or 1260 nm and 1625 nm, and
the lens is configured such that the invisible light transmitted through the lens forms an image of the optical device active layer at an optical fiber coupling plane, the optical fiber coupling plane being a plane at which an end surface of the optical fiber is located when the ferrule is attached to the sleeve,
the method comprising the steps of:
applying the invisible light onto the resin member and the optical device;
observing a part of the resin member located at the optical fiber coupling plane and an image formed at the optical fiber coupling plane by the optical device active layer, with use of a camera, while applying the invisible light onto the resin member and the optical device;
aligning positions of the resin member and the circuit board with respect to each other while observing the part of the resin member located at the optical fiber coupling plane and the image formed at the optical fiber coupling plane; and
fixing the resin member to the circuit board while maintaining the aligned positions of the resin member and the circuit board.

2. The method of manufacturing the optical module according to claim 1, wherein
the optical fiber coupling plane is a bottom surface of the sleeve,
the sleeve includes a relief hole extending from the bottom surface at a position corresponding to the end surface of the optical fiber when the ferrule is in the sleeve, the relief hole being configured such that the end surface of the optical fiber is not in contact with the sleeve, and
the aligning step includes observing a hole edge of the relief hole.

3. The method of manufacturing the optical module according to claim 1, wherein the applying step includes applying the invisible light at a wavelength of 850 nm.

4. The method of manufacturing the optical module according to claim 1, further comprising integrating the resin member and a metal shield with the resin member by insert molding using the synthetic resin such that the metal shield covers the optical device, the shield including a board connector protruding toward the circuit board and connected to conduction paths on the circuit board, wherein the fixing step includes soldering the board connector to the conduction paths.

5. An optical module, comprising:
a circuit board;
an optical device mounted on the circuit board; and
a sleeve member arranged on the circuit board and covering the optical device, the sleeve member being formed of a light-transmissive synthetic resin and having a sleeve configured to receive a ferrule fitted around a terminal of an optical fiber, wherein
the sleeve member includes a lens on an axis of the sleeve,
the optical device includes an optical device active layer configured to emit or receive invisible light having a single wavelength of 800 nm and 900 nm or 1260 nm and 1625 nm,
the lens is configured such that the invisible light transmitted through the lens forms an image of the optical device active layer at an optical fiber coupling plane where an end surface of the optical fiber is located when the ferrule is attached to the sleeve, and
the sleeve member includes a visually recognizable mark at a position corresponding to an image forming plane where an image of the optical device is formed by the visible light transmitted through the lens, the visible light having a wavelength different from the wavelength of the invisible light.

6. The optical module according to claim 5, wherein
the sleeve member covering the optical device includes a metal shield integrated with the sleeve member by insert molding using the synthetic resin, the shield including a window on an optical path between the optical device and the lens, the window extending through the shield, and
the shield further includes a board connector protruding toward the circuit board and connected to conduction paths provided to the circuit board by soldering.

7. The optical module according to claim 5, wherein
the sleeve member includes a relief hole extending from a bottom surface of the sleeve, the relief hole being configured such that the end surface of the optical fiber in the sleeve is not in contact with the sleeve, and
the mark is provided at an inner surface of the relief hole.

8. The optical module according to claim 7, wherein
the relief hole includes a hole edge with a tapered surface such that diameter of the relief hole decreases toward a bottom surface of the relief hole, and
the tapered surface and an inner wall surface of the relief hole define a boundary at a position corresponding to the image forming plane.

9. The optical module according to claim 7, wherein the relief hole has a bottom surface located at a position corresponding to the image forming plane.

10. The optical module according to claim 5, wherein the sleeve member includes a recess extending from a bottom surface of the sleeve, and
the recess has a bottom surface located at a position corresponding to the image forming plane.

* * * * *